(12) United States Patent
Soeda et al.

(10) Patent No.: US 7,989,748 B2
(45) Date of Patent: Aug. 2, 2011

(54) IMAGE READING APPARATUS, IMAGE FORMING APPARATUS, IMAGE INSPECTING APPARATUS AND IMAGE FORMING SYSTEM

(75) Inventors: Yoshihisa Soeda, Kanagawa (JP); Norio Yamada, Saitama (JP); Yoshinobu Kagami, Kanagawa (JP); Osamu Inage, Kanagawa (JP); Kenichi Satoh, Miyagi (JP); Atsushi Ikeda, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 1420 days.

(21) Appl. No.: 11/484,641

(22) Filed: Jul. 12, 2006

(65) Prior Publication Data

US 2007/0013954 A1   Jan. 18, 2007

(30) Foreign Application Priority Data

Jul. 13, 2005 (JP) .................. 2005-204837
Jul. 13, 2005 (JP) .................. 2005-204840
Mar. 17, 2006 (JP) .................. 2006-075710

(51) Int. Cl.
*H01L 27/00* (2006.01)
*G01N 21/88* (2006.01)
*H04N 5/217* (2006.01)
*H04N 9/64* (2006.01)

(52) U.S. Cl. ............. 250/208.1; 250/559.45; 348/241; 348/246

(58) Field of Classification Search ............ 250/208.1, 250/214.1, 201.3, 202, 559.45; 348/241, 348/231.99, 246, 247, 294; 356/237.1–237.5, 356/239.1–239.8
See application file for complete search history.

(56) References Cited

U.S. PATENT DOCUMENTS

| 4,638,362 | A | * | 1/1987 | Oshima et al. ............ 348/317 |
| 5,027,117 | A | | 6/1991 | Yoshida et al. |
| 6,198,349 | B1 | | 3/2001 | Kanno et al. |
| 6,426,804 | B1 | | 7/2002 | Kanno et al. |
| 6,641,040 | B2 | | 11/2003 | Inage |
| 6,867,885 | B2 | | 3/2005 | Inage |
| 7,423,784 | B2 | | 9/2008 | Tanabe et al. |
| 2002/0012127 | A1 | | 1/2002 | Soeda et al. |

(Continued)

FOREIGN PATENT DOCUMENTS

JP   03-021161   1/1991

(Continued)

OTHER PUBLICATIONS

Japanese Office Action issued in corresponding application Jul. 27, 2010.

(Continued)

*Primary Examiner* — Georgia Y Epps
*Assistant Examiner* — Don Williams
(74) *Attorney, Agent, or Firm* — Harness, Dickey & Pierce, P.L.C.

(57) ABSTRACT

A level detecting part detects image data levels for the respective output directions of the first half and the second half to be used for the linearity correction, which image data levels correspond to image data around a connection point between the first half and the second half and are obtained from respective combinations for the respective output directions of the first half and the second half. A calculating part calculates linearity correction values or correction value calculating parameters from the detected image data levels for any one of the first half and the second half; and a defect detection part detecting a defect in the image data levels thus detected around the connection point are provided.

30 Claims, 39 Drawing Sheets

U.S. PATENT DOCUMENTS

| | | | |
|---|---|---|---|
| 2002/0027440 A1* | 3/2002 | Shinada et al. | 324/751 |
| 2003/0016398 A1 | 1/2003 | Soeda | |
| 2005/0105143 A1 | 5/2005 | Kagami | |
| 2005/0254102 A1 | 11/2005 | Kagami | |
| 2005/0270589 A1 | 12/2005 | Soeda | |
| 2006/0197853 A1* | 9/2006 | Miyashita | 348/241 |

FOREIGN PATENT DOCUMENTS

| | | |
|---|---|---|
| JP | 09-093433 | 4/1997 |
| JP | 11-215298 | 6/1999 |
| JP | 2000-188686 | 4/2000 |
| JP | 2000-156782 | 6/2000 |
| JP | 2000-358159 | 12/2000 |
| JP | 2001-211297 | 8/2001 |
| JP | 2002-158837 | 5/2002 |
| JP | 2002-185781 | 6/2002 |
| JP | 2002-218186 | 8/2002 |
| JP | 2003-060860 | 2/2003 |
| JP | 2003-219172 | 7/2003 |
| JP | 2004-297691 | 10/2004 |
| JP | 2005-348351 | 12/2005 |

OTHER PUBLICATIONS

Japanese Office Action for corresponding Application No. 2006-075710.

* cited by examiner

FIG.10

CORRECTION DATA GENERATING GRAY SCALE CHART READ DATA (AFTER SHADING CORRECTION)

| REFLECTANCE (%) | FIRST HALF DATA | SECOND HALF DATA | LEVEL DIFFERENCE | DIFFERENCE IN LEVEL DIFFERENCE |
|---|---|---|---|---|
| 87.6 | 1019 | 1018 | 1 | 1 |
| 85.2 | 1008 | 1006 | 2 | 1 |
| 80.7 | 937 | 932 | 5 | 3 |
| 73.8 | 845 | 838 | 7 | 2 |
| 69.3 | 769 | 760 | 9 | 2 |
| 64.0 | 698 | 686 | 12 | 3 |
| 59.4 | 634 | 619 | 15 | 3 |
| 55.2 | 582 | 565 | 17 | 2 |
| 49.4 | 511 | 492 | 19 | 2 |
| 44.0 | 446 | 424 | 22 | 3 |
| 39.2 | 388 | 365 | 23 | 1 |
| 34.8 | 340 | 316 | 24 | 1 |
| 29.5 | 283 | 260 | 23 | 1 |
| 24.8 | 235 | 213 | 22 | 1 |
| 19.3 | 181 | 162 | 19 | 3 |
| 14.3 | 131 | 115 | 16 | 3 |
| 9.5 | 87 | 75 | 12 | 4 |
| 4.5 | 45 | 37 | 8 | 4 |
| 2.1 | 22 | 18 | 4 | 4 |
| 1.4 | 18 | 16 | 2 | 2 |

| DIFFERENCE AVERAGE | 2.3 |
|---|---|
| STANDARD DEVIATION | 1.1 |

FIG.13

| REFLECTANCE (%) | FIRST HALF DATA | SECOND HALF DATA | LEVEL DIFFERENCE | DIFFERENCE IN LEVEL DIFFERENCE |
|---|---|---|---|---|
| 87.6 | 1019 | 1018 | 1 | 1 |
| 85.2 | 1008 | 1006 | 2 | 1 |
| 80.7 | 937 | 932 | 5 | 3 |
| 73.8 | 845 | 838 | 7 | 2 |
| 69.3 | 769 | 760 | 9 | 2 |
| 64.0 | 698 | 686 | 12 | 3 |
| 59.4 | 634 | 619 | 15 | 3 |
| 55.2 | 582 | 542 | 40 | 25 |
| 49.4 | 511 | 492 | 19 | 21 |
| 44.0 | 446 | 424 | 22 | 3 |
| 39.2 | 388 | 365 | 23 | 1 |
| 34.8 | 340 | 316 | 24 | 1 |
| 29.5 | 283 | 260 | 23 | 1 |
| 24.8 | 235 | 213 | 22 | 1 |
| 19.3 | 181 | 162 | 19 | 3 |
| 14.3 | 131 | 115 | 16 | 3 |
| 9.5 | 87 | 75 | 12 | 4 |
| 4.5 | 45 | 37 | 8 | 4 |
| 2.1 | 22 | 18 | 4 | 4 |
| 1.4 | 18 | 16 | 2 | 2 |

| DIFFERENCE AVERAGE | 4.4 |
|---|---|
| STANDARD DEVIATION | 6.5 |

FIG.15

| REFLECTANCE (%) | FIRST HALF DATA | SECOND HALF DATA | LEVEL DIFFERENCE | DIFFERENCE IN LEVEL DIFFERENCE |
|---|---|---|---|---|
| 87.6 | 1019 | 1018 | 1 | 1 |
| 85.2 | 1008 | 1006 | 2 | 1 |
| 80.7 | 937 | 932 | 5 | 3 |
| 73.8 | 845 | 838 | 7 | 2 |
| 69.3 | 769 | 760 | 9 | 2 |
| 64.0 | 698 | 686 | 12 | 3 |
| 59.4 | 634 | 619 | 15 | 3 |
| 55.2 | 582 | 565 | 17 | 2 |
| 49.4 | 511 | 492 | 19 | 2 |
| 44.0 | 446 | 424 | 22 | 3 |
| 39.2 | 388 | 365 | 23 | 1 |
| 34.8 | 340 | 316 | 24 | 1 |
| 29.5 | 283 | 260 | 23 | 1 |
| 24.8 | 235 | 213 | 22 | 1 |
| 19.3 | 181 | 162 | 19 | 3 |
| 14.3 | 131 | 115 | 16 | 3 |
| 9.5 | 87 | 75 | 12 | 4 |
| 4.5 | 45 | 37 | 8 | 4 |
| 2.1 | 22 | 18 | 4 | 4 |
| 1.4 | 18 | 16 | 2 | 2 |

FIG.29

| REFLECTANCE (%) | FIRST HALF DATA | SECOND HALF DATA |
|---:|---:|---:|
| 87.6 | 1019 | 1017 |
| 85.2 | 1008 | 1004 |
| 80.7 | 937 | 931 |
| 73.8 | 845 | 837 |
| 69.3 | 769 | 759 |
| 64.0 | 698 | 686 |
| 59.4 | 634 | 620 |
| 55.2 | 582 | 566 |
| 49.4 | 511 | 493 |
| 44.0 | 446 | 426 |
| 39.2 | 388 | 366 |
| 34.8 | 340 | 316 |
| 29.5 | 283 | 258 |
| 24.8 | 235 | 213 |
| 19.3 | 181 | 163 |
| 14.3 | 131 | 117 |
| 9.5 | 87 | 77 |
| 4.5 | 45 | 38 |
| 2.1 | 22 | 18 |
| 1.4 | 18 | 16 |

20 TONE GRAY SCALE CHART READ LEVEL DISTRIBUTION

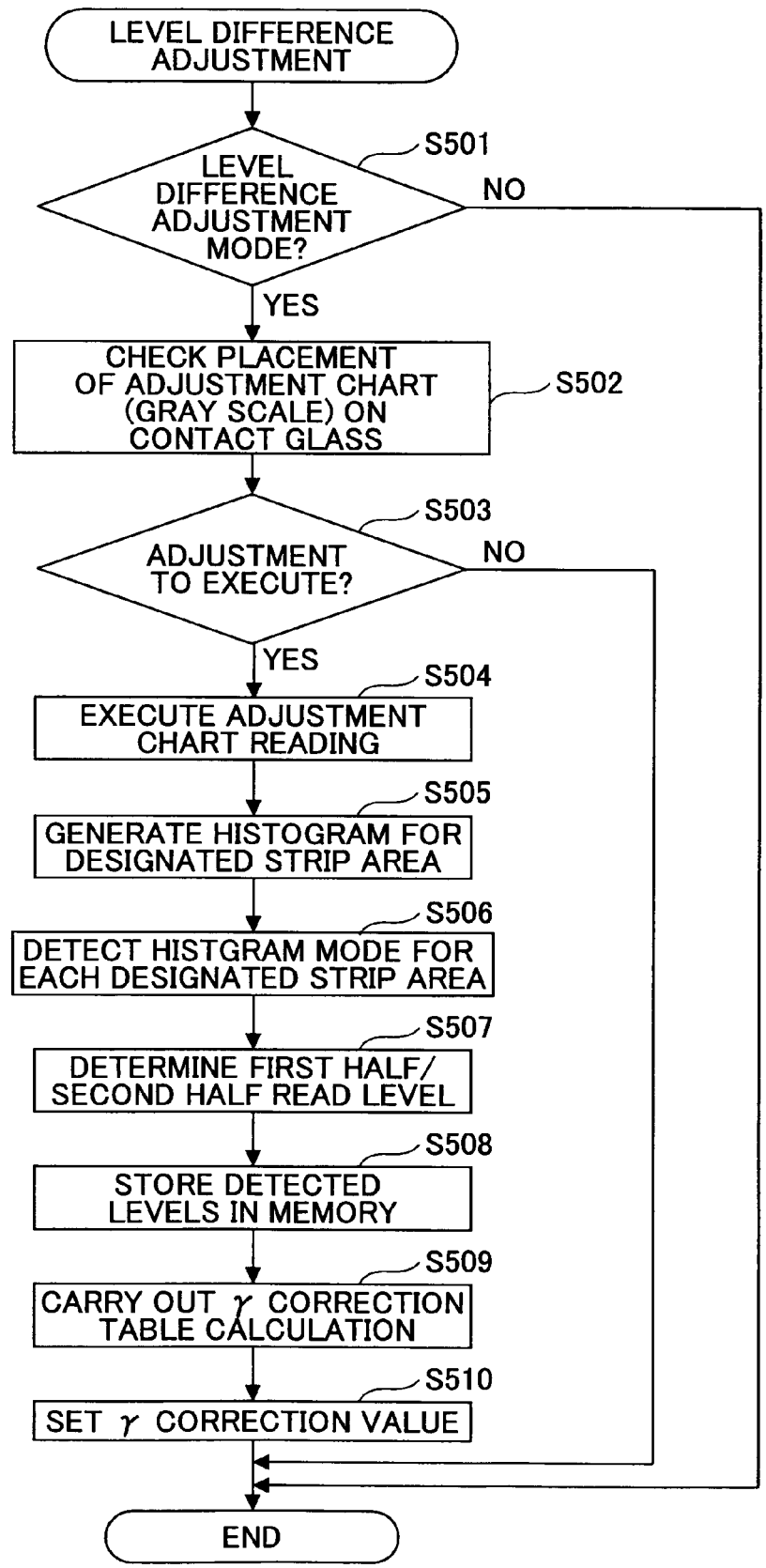

IMAGE READING APPARATUS, IMAGE FORMING APPARATUS, IMAGE INSPECTING APPARATUS AND IMAGE FORMING SYSTEM

BACKGROUND OF THE INVENTION

1. Field of the Invention

The present invention relates to an image reading apparatus employing a CCD image sensor having multi-channel shift registers, an image forming apparatus such as a digital copier, a scanner, a facsimile machine, a digital multi-function machine or such provided with the image reading apparatus, an image inspecting apparatus for inspecting for a defect from an image read by means of the image reading apparatus, and an image forming system including the image inspecting apparatus, the image reading apparatus and the image forming apparatus.

2. Description of the Related Art

Recently an image reading apparatus has been proposed, which apparatus carries out line scanning of image information such as an original in a sub-scanning direction, forms the image information on a sensor surface of a photoelectric converting part (CCD) which acts as an image reading part, and reads the image information with the use of an output signal obtained from the photoelectric converting part. FIG. 1 (a) shows one example of such an image reading apparatus.

In FIG. 1 (a), an image reading apparatus 100 carries out operation of reading an original 5 by scanning the original 5 in a right direction with moving a first carriage 9 and a second carriage 12 by means of a scanner motor with lighting the original 15 by means of an original light source (lamp) 7, when the original 5 is placed on a contact glass 1. At this time, original image information of the original 5 on the contact glass 1 (original placement glass part) lit by means of the original light source 7 is formed on a CCD (photoelectric converting part) sensor surface by means of an imaging lens 13 through scanning first, second and third mirrors 8, 10 and 11, the original image information thus formed on the CCD sensor surface is read by the CCD, and is converted into digital data by an A-D converter mounted on a circuit substrate 14 together with the CCD. Thus, the original image data is digitally read. The original image information in the form of digital data is sent to an output apparatus, for example, and therewith, the image information is printed out. Alternatively, it is sent to a storage apparatus, and is stored therein. Thus, the thus-read image information is used in various ways.

When the original image is read with the carriages 9 and 12 moving to scan the original 5, the scanning first and second carriages 9 and 12 are moved with a fixed relationship in a direction of an arrow (sub-scanning direction) for scanning the original 5 in the sub-scanning direction. At this time, scanning speeds of the respective carriages 9 and 12 are set so that the scanning speed of the second carriage 12 is half the scanning speed of the first carriage 9.

In prior to actually reading image data by thus scanning the original, read data of a shading correction standard white plate 3 shown in FIG. 1 (a) is obtained, shading correction data is generated, which is then stored in a memory, the shading correction data is then used to normalize image data of the original 5, thus, a light quantity distribution variation, a CCD sensitivity variation, and an output variation and so forth are corrected and thus, the image information of the original is finally read with a high accuracy.

Further, along with a recent increase in the speed of the scanner, an increase in operation speed of the CCD has been demanded. In order to meet the demand, for the purpose of increasing the reading speed while the processing speed is left unincreased much, a CCD image sensor configured such that the CCD shift registers are divided into even-numbered pixels and odd-numbered pixels, and output is made therefrom separately, has been used recently.

In order to achieve further increase in the reading speed, an CCD image sensor having a plurality of register groups, i.e., more than four groups (i.e., more than four-series CCD shift registers), from which output is made separately, has been used recently. As such a type of the four-series CCD shift registers, a type in which outputs of the four series are made in a same direction, another type in which, from the two series outputs are taken in each of first half and second half directions, or such, may be used. FIG. 2 shows the latter type of a CCD image sensor. The image sensor shown in FIG. 2 is of a well-known type, includes photodiodes 21, shift gates 22, CCD analog shift registers 23, output buffers 24 and output terminals OS1, OS2, OS3 and OS4. From CP terminals, RS terminals, SH terminals, φ1, φ2 terminals and φ2B terminals, clamp clock signals, reset clock signals, shift control signals, transfer clock signals and driving clock signals are provided, respectively. The driving clock signals provided via the φ2B is the same as those of the φ1 and φ2 terminals, but are provided only to the output stages. Commonly, CCD output timing is determined by the timing of the driving clock signals provided from the φ2B terminals.

A voltage potential in the shift register's last stage varies due to a variation in the process condition when the CCD is produced, in the image sensor employing the plurality of CCD shift registers 23. Thereby, analog output delay time may have a variation. Such a variation in the analog output delay time may adversely affect the linearity of the analog output for when an entrance light quaintly is relatively low, and, as shown in FIGS. 3 and 4, a difference occurs in the linearity among the outputs of the respective CCD shift registers.

That is, difference occurs in the output delay time due to a variation in the φ2B potential well, as shown in FIG. 3. This difference results in the difference in the linearity where a difference occurs between a true signal and a CCD output due to a charge quantity. Thereby, the φ2B output and the CCD output do not correspond to one another in a one-to-one manner. As shown in FIG. 5, the difference in the linearity among the CCD shift register outputs cannot be corrected by means of shading correction. Accordingly, especially a level difference at a connection point between the first half and the second half from a middle tone through a high tone may result in a problematic image quality degradation on a finally obtained image, when the CCD in a type such that the outputs are made in opposite directions in the respective ones of the first half and the second half shift registers. It is noted that, in FIGS. 4 and 5, OSn denotes the first half part CCD output (i.e., OS1 and OS2 in the example of FIG. 2) while OSm denotes second half part CCD output (i.e., OS3 and OS4 in the example of FIG. 2).

In order to solve the problem due to the difference in the linearity among the respective CCD shift registers, a method has been proposed in which γ correction is carried out for each of the two series (even/odd-numbered pixel output type) of the shift registers. Further, as mentioned above, patent documents 1 and 2, described below, disclose a method in which, in a CCD of a four-series output type, γ correction is carried out for each CCD shift register.

In the art of the patent document 1, in order to remove variation between the right and left CCD characteristics due to difference in the CCD devices, to reproduce stable image tones with no tone difference between the left and right machine bodies, and also, to carry out image tone representation including no variation in the tones between the machine bodies, tone patterns generated by the machine bodies are output, correction processing calculation is carried out with the use of a difference in the image data between the left side and the right side of the four channel outputs for the respective tone data, which is obtained from reading of the tone patterns, correction data thus calculated is set in the left and right correction tables of the left and right correction circuits, γ correction is carried out based on the image data of the left side as standard data, and setting is made in a γ correction table.

According to the patent document 2, in an image sensor of a left and right separate reading system, in order to reduce a signal difference, and also, in order to make linearity characteristics of respective outputs coincident, the following components are provided: a color linear image sensor in the left and right separate reading system; a plurality of signal processing parts carrying out predetermined signal processing on the image signals output from the respective output terminals of the color linear image sensor; a white plate; a grey standard plate; a CPU which makes an image signal level from the white plate coincident with a first predetermined level, makes an image signal level from the gray stranded plate coincident with a second predetermined level, and obtains adjustment data for adjusting the image signal levels of other tones into levels obtained from interpolation between the first and second predetermined levels; and a lookup table (abbreviated by LUT, hereinafter) for adjusting the image signals output form the plurality of signal processing parts with the use of the adjustment data.

The following patent documents 1-3 disclose the related arts:

Patent document 1: Japanese Laid-open Patent Application No. 2000-188686;

Patent document 2: Japanese Laid-open Patent Application No. 2002-218186; and

Patent document 3: Japanese Laid-open Patent Application No. 2005-348351.

SUMMARY OF THE INVENTION

However, in the art of the patent document 1, odd-numbered pixels of the first half and the second half of the four series output data are combined in the analog manner, and in the same way, even-numbered pixels of the first half and the second half of the four series output data are combined in the analog manner. As a result, a defect image may be obtained since cross talk may occur in the first half and second half data. According to the art of the patent document 2, the LUT is provided for each shift register of the CCD. Accordingly, due to the increase in the number of memories, which is required accordingly, the costs may increase accordingly. Further, since the correction values are obtained by means of interpolation between the two standard read levels, the accuracy in the correction may not be sufficiently high.

Further, no prior art has been found which relates to a color image sensor in a first half/second half reading type, with a consideration of gray balance. The patent document 2 discloses that white and gray standard colors are read, and a converting part is provided to convert the thus-obtained values into 'predetermined fixed values'. However, this document is silent for gray balance. A value for considering gray balance may be set as the above-mentioned 'predetermined fixed values'. However, when this method is applied to a three-line CCD which is of such a type as that of a first half/second half reading type for RGB three colors, total 12 converting parts are required (3×4=12), and this method may be difficult to be put into a piratical use in an actual product in terms of the costs and the circuit scale required.

The present invention has been devised in consideration of the above-described situation, and an object of the present invention is to prevent occurrence of a defect image by appropriately correcting image tone difference at the connection point without much increase in the cost.

In order to achieve the object, according to a first aspect of the present invention, an image reading apparatus includes: an image sensor in which a shift register for transferring electric charge from photodiodes are divided into a first half and a second half, from which image data is output in respective output directions; a linearity correcting part correcting linearity for the first half and the second half; a level detecting part detecting image data levels for the respective output directions of the first half and the second half, which image data levels correspond to image data of a connection point between the first half and the second half and are obtained from respective combinations of the respective output directions of the first half and the second half; a calculating part calculating linearity correction values or correction value calculating parameters from the detected image data levels in any one of the first half and the second half; and a defect detection part detecting a defect in the image data levels, if any, of the connection point.

According to a second aspect of the present invention, the image reading apparatus according to the first aspect of the present invention may further include a correcting part correcting the detected image data level when the defect detecting part detects a defect in the image data level of the first half or the second half.

According to a third aspect of the present invention, the image reading apparatus according to the first or the second aspect of the present invention may further include a display part displaying a defect indication when the defect detecting part detects a defect in the image data level of the first half or the second half.

According to a fourth aspect of the present invention, the image reading apparatus according to the first or the second aspect of the present invention may further include a control part carrying out a retry when the defect detecting part detects a defect in the image data level of the first half or the second half.

According to a fifth aspect of the present invention, in the image reading apparatus according to any one of the first through fourth aspects of the present invention, the image data of the connection point between the first half and the second half used for the correction may be image data obtained when a grey scale chart is read.

According to a sixth aspect of the present invention, the image reading apparatus according to any one of the first through fifth aspects of the present invention may further include a storage part storing the correction values or the correction value parameters.

According to a seventh aspect of the present invention, an image forming apparatus may be provided with the image reading apparatus according to any one of the first through sixth aspects of the present invention.

According to an eighth aspect of the present invention, an image inspecting apparatus, connected to an image reading apparatus, which comprises an image sensor in which a shift register for transferring electric charge from photodiodes is divided into a first half and a second half, from which image data is output in respective output directions; and a linearity correcting part correcting linearity between the first half and the second half, by detecting image data of a connection point between the first half and the second half, includes: a taking part taking image data from the image reading apparatus; a level detecting part detecting, from the image data taken by means of the taking part, image data levels for the respective output directions of the first half and the second half to be used for the linearity correction, which image data levels correspond to image data of the connection point between the first half and the second half and are obtained from respective combinations of the respective output directions of the first half and the second half; and a defect detection part detecting a defect in the image data levels thus detected, if any, of the connection point.

According to a ninth aspect of the present invention, the image inspecting apparatus according to the eighth aspect of the present invention may calculate linearity correction values or correction value calculating parameters for any one of the first half and the second half from the image data levels detected by the level detecting part.

According to a tenth aspect of the present invention, in the image inspecting apparatus according to the ninth aspect of the present invention, the linearity correction values or the correction value calculating parameters thus calculated may be transferred to the image reading apparatus.

According to an eleventh aspect of the present invention, an image forming system may be provided with the image inspecting apparatus according to any one of the eighth through tenth aspects of the present invention; an image forming apparatus including the image reading apparatus; and an instruction part for inputting an instruction to the image inspecting apparatus, and wherein: the instruction part includes an operation part of the image forming apparatus.

It is noted that, in an embodiment described later, a reference numeral 21 corresponds to the photodiodes; a reference numeral 23 corresponds to the shift registers, a reference numeral 101 corresponds to the image sensor, a scanner γ correction part 108 corresponds to the linearity correcting part, a signal processing part 103 corresponds to the level detecting part, a CPU 110 corresponds to the calculating part, the correcting part and the control part; a memory 111 corresponds to the storage part; a reference numeral 50 corresponds to a gray scale chart; a reference numeral 51, 52 and 53 correspond to the connection point; an image evaluation apparatus 205 corresponds to the image inspecting apparatus; and a reference numeral 200 corresponds to the operation part (i.e., an operation panel).

According to a twelfth aspect of the present invention, an image reading apparatus includes: an image sensor in which a shift registers for transferring electric charge from photodiodes is divided into a first half and a second half, from which image data is output in respective output directions; a digital converting part carrying out signal processing on the output from the image sensor for the respective output directions of the first half and the second half and converting it into digital output; a combining part combining the digital output for the respective output directions of the first half and the second half; a linearity correcting part correcting linearity for the respective output directions of the first half and the second half; a mode obtaining part obtaining modes in each of the respective output directions of the first half and the second half from histogram of a connection point between the first half and the second half of the data thus combined; and a calculating part calculating correction values for linearity correction for any one of the first half and the second half with the use of the modes thus obtained.

According to a thirteenth aspect of the present invention, an image reading apparatus includes: an image sensor in which a shift register for transferring electric charge from photodiodes is divided into a first half and a second half, from which image data is output in respective output directions; a digital converting part carrying out signal processing on the output from the image sensor for the respective output directions of the first half and the second half and converting it into digital output; a combining part combining the digital output for the respective output directions of the first half and the second half; a linearity correcting part correcting linearity for the respective output directions of the first half and the second half; and a calculating part calculating correction values for linearity correction for any one of the first half and the second half based on data of a connection point between the first half and the second half of the thus-combined data for the respective output directions of the first half and the second half.

According to a fourteenth aspect of the present invention, in the thirteenth aspect of the present invention, gray balance adjustment is carried out with the use of only one of the first half data and the second half data used for the linearity correction, which one of the first half data and the second half data is regarded as a standard for the linearity correction, and after that, the linearity correction is carried out on the other one According to a fifteenth aspect of the present invention, any one of the twelfth through fourteenth aspects of the present invention may further include a storage part storing the correction values calculated by the calculating part.

According to a sixteenth aspect of the present invention, in any one of the twelfth through fifteenth aspects of the present invention, the data used by the calculating part may be image data obtained from a gray scale chart placed on an original reading part.

According to a seventeenth aspect of the present invention, in any one of the twelfth through fifteenth aspects of the present invention, the data used by the calculating part may be image data obtained from a gray scale chart set in such a manner that it can be read as if an original is read.

According to an eighteenth aspect of the present invention, any one of the twelfth through seventeenth aspects of the present invention may further include a part of carrying out interpolation calculation to obtain correction data corresponding to an output between actually read data of respective tones.

According to a nineteenth aspect of the present invention, in any one of the twelfth through eighteenth aspects of the present invention, the calculating part may include a lookup table.

According to a twentieth aspect of the present invention, any one of the twelfth through nineteenth aspects of the present invention may further include an instruction part for providing an instruction to the calculating part to actually carry out the calculation of the linearity correction values, wherein the calculating part reads gray scale chart data in response to an execution instruction given from the instruction part, and carries out calculation of the correction values, and stores the same.

According to a twenty-first aspect of the present invention, in the twentieth aspect of the present invention, the instruction part may be provided in an operation part provided for inputting various operations According to a twenty-second aspect of the present invention, an image forming apparatus may be provided with the image reading apparatus in any one of the twelfth through twenty-first aspects of the present invention.

In an embodiment described later, a reference numeral 101 corresponds to the image sensor or the color image sensor; a signal processing part 103 corresponds to the part of carrying out signal processing and digital conversion; a scanner γ correction part 107 and a CPU 110 correspond to the linearity correcting part; a connection point mode detecting part 106 corresponds to the part of obtaining modes; the CPU 110 corresponds to the calculating part; a memory 111 corresponds to the storage part; a reference numeral 50 corresponds to the gray scale chart; connection point areas 51, 52, 53 correspond to the connection point; a contact glass 1 corresponds to the original reading part; an operation part (or operation panel) 200 corresponds to the instruction part; and a scanner γ correction part 107 corresponds to the calculating part.

In the above-mentioned first through eleventh aspects of the present invention, as data to be used for correction, first half and second half connection point image data levels of data combined for each output direction of the first half and the second half are detected for the respective one of the corresponding output directions, linearity correction values or linearity correction value calculating parameters are calculated for any one of the first half data and the second half data from the thus-detected image data levels, and a defect is detected, if any, for the thus-detected image data levels of the connection point. Thereby, the connection point image tone difference is corrected, and an occurrence of a defective image can be avoided.

In the above-mentioned twelfth through twenty-second aspects of the present invention, from histograms of first half and second half connection point data combined for respective corresponding output directions of the first half and the second half, modes are obtained for the respective output directions of the first half and the second half, and linearity correction values are calculated for any one of the first half and the second half with the use of the thus-obtained modes. Accordingly, the connection point image tone difference is corrected, and thus, occurrence of a defective image can be avoided, without much increase in the costs.

BRIEF DESCRIPTION OF THE DRAWINGS

Other objects and further features of the present invention will become more apparent from the following detailed description when read in conjunction with the accompanying drawings:

FIG. 10 shows one example of correction data generating gray scale chart read data;

FIG. 13 illustrates a case where a defect exists in the correction data generating gray scale read data;

FIG. 15 shows data corrected from defective data by means of interoperation calculation;

FIG. 29 shows relationship between reflectance and modes in the correction data generating gray scale chart read data;

FIG. 41 shows a flow chart of a control procedure of level adjustment data (scanner γ correction value) setting operation in a method in which the influence of a noise factor such as a stain in the gray scale chart illustrated in FIG. 40 can be removed, according to the embodiment of the present invention.

DETAILED DESCRIPTION OF THE PREFERRED EMBODIMENTS

First Embodiment

Figure 1:
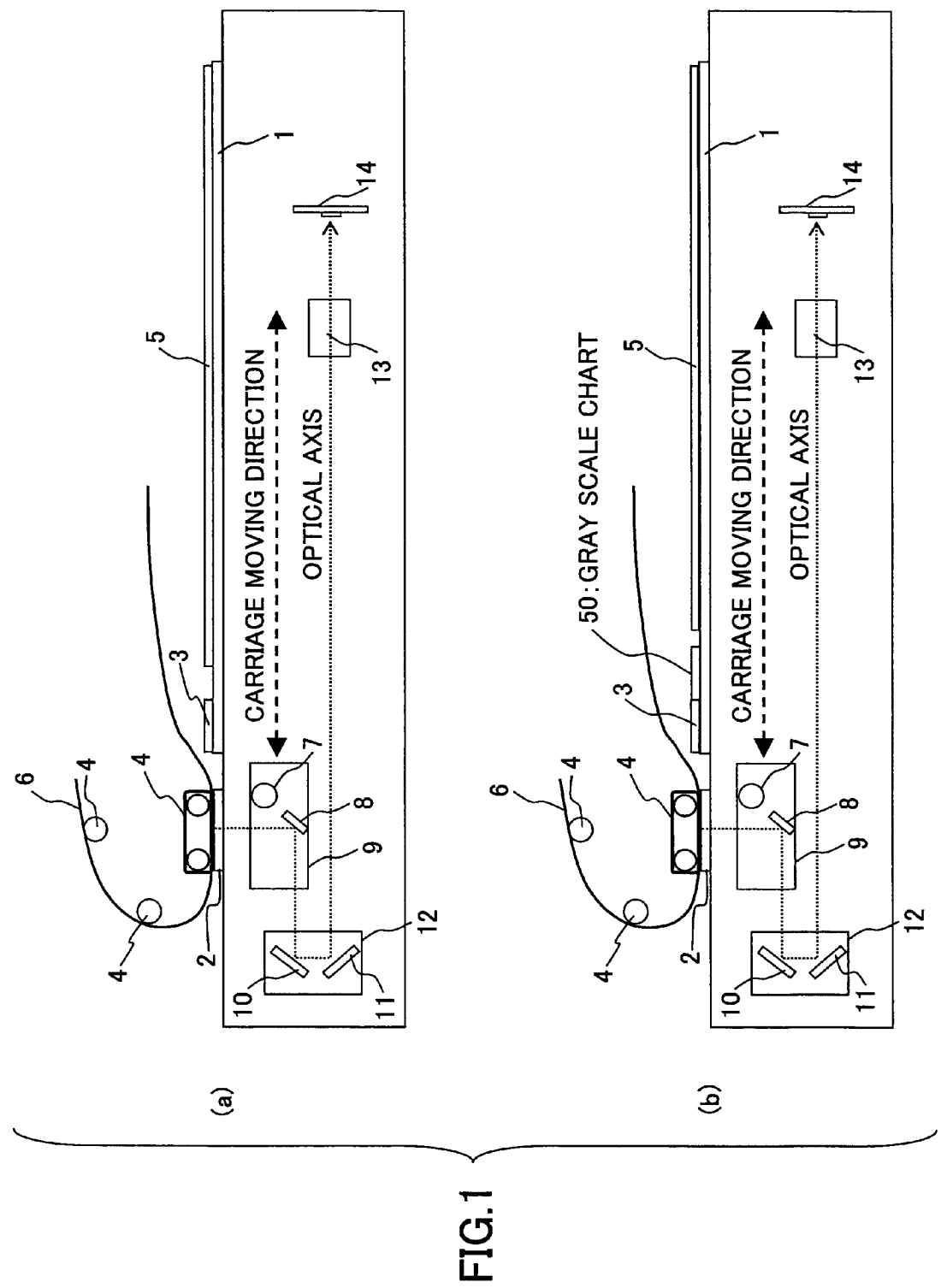
FIG. 1 shows a general partial view of one example of an image reading apparatus in the related art (a); and a state in which, in an image reading apparatus according to a first embodiment of the present invention, a gray scale chart is placed on a contact glass (b)

According to a first embodiment of the present invention, an image reading apparatus is configured, generally the same as that shown in FIG. 1 (*a*) in the related art. That is, it includes a contact glass 1 on which an original is placed; a sheet through glass 2; a shading data generating standard white plate 3; a lamp 11 for lighting the original; a first carriage 9 on which a first mirror 8 is mounted; a second carriage 12 on which second and third mirrors 10 and 11 are mounted; a lens unit with which an image is formed in a reduced manner on a CCD image sensor; a reading circuit substrate 14 on which the CCD image sensor is mounted; a scanner driving motor (not shown) driving the first and second carriages; a home position sensor (not shown); an original detection sensor (not shown), and so forth.

Figure 2:
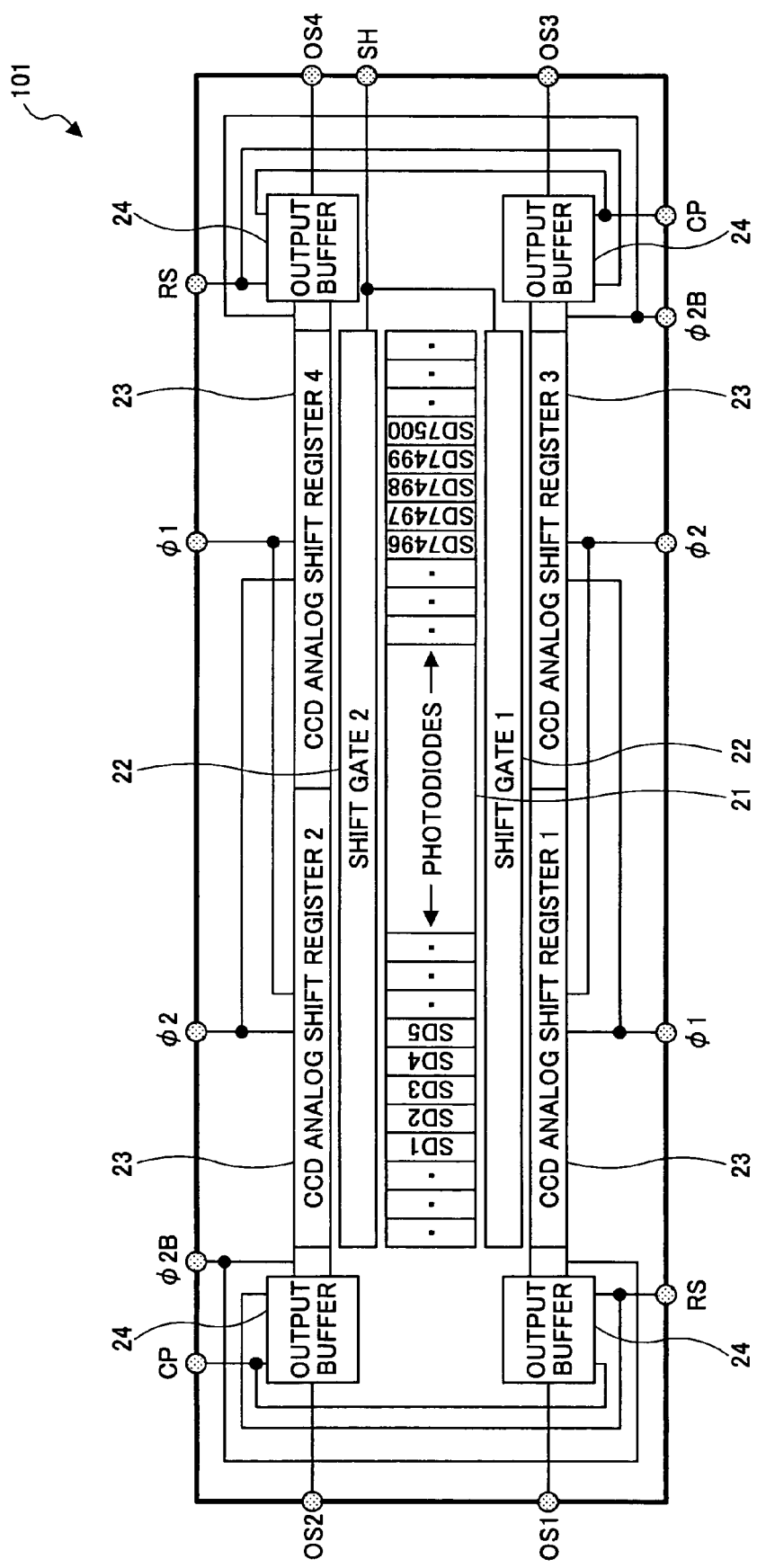
FIG. 2 shows a configuration of CCD shift registers in a type of four series in which two series outputs are made from each of first half shift registers and second half shift registers of the image reading apparatus according to the present invention.
Figure 3:
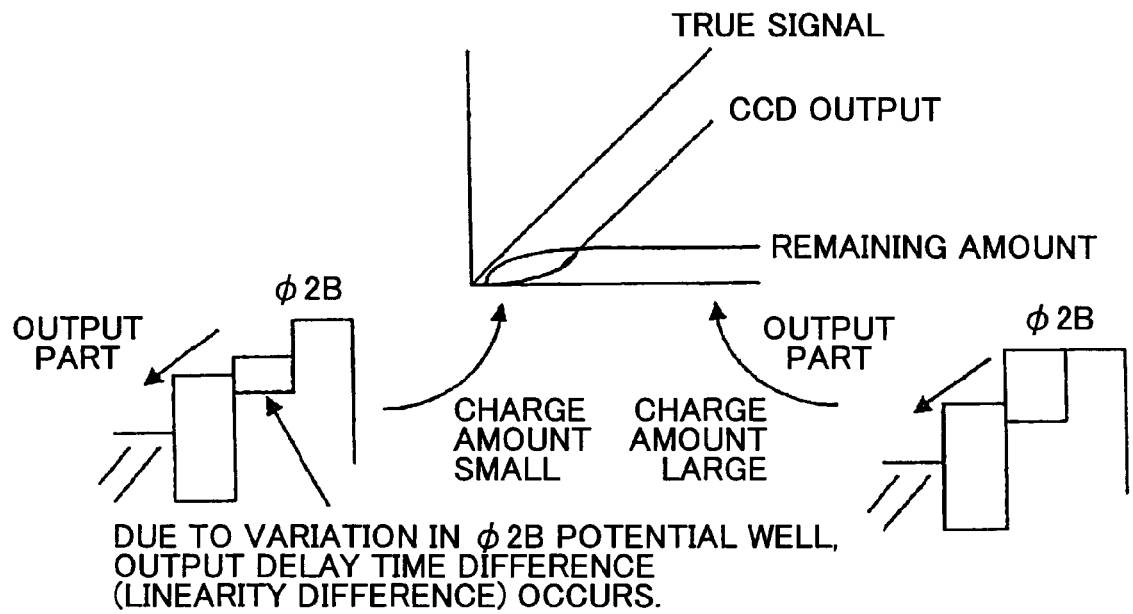
FIG. 3 shows a difference in CCD shift register outputs due to a variation in analog output delay time.
Figure 4:
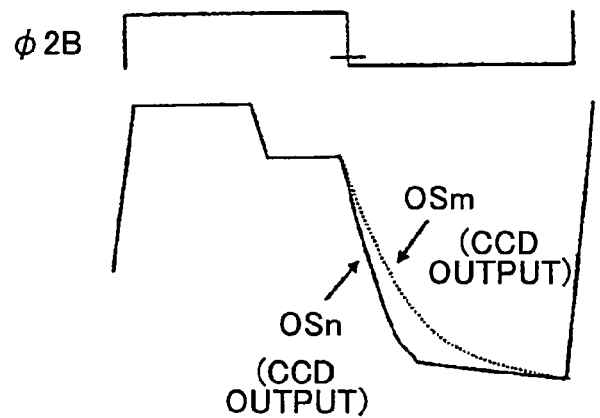
FIG. 4 shows a relationship between a driving waveform and linearity among CCD shift register outputs.
Figure 5:
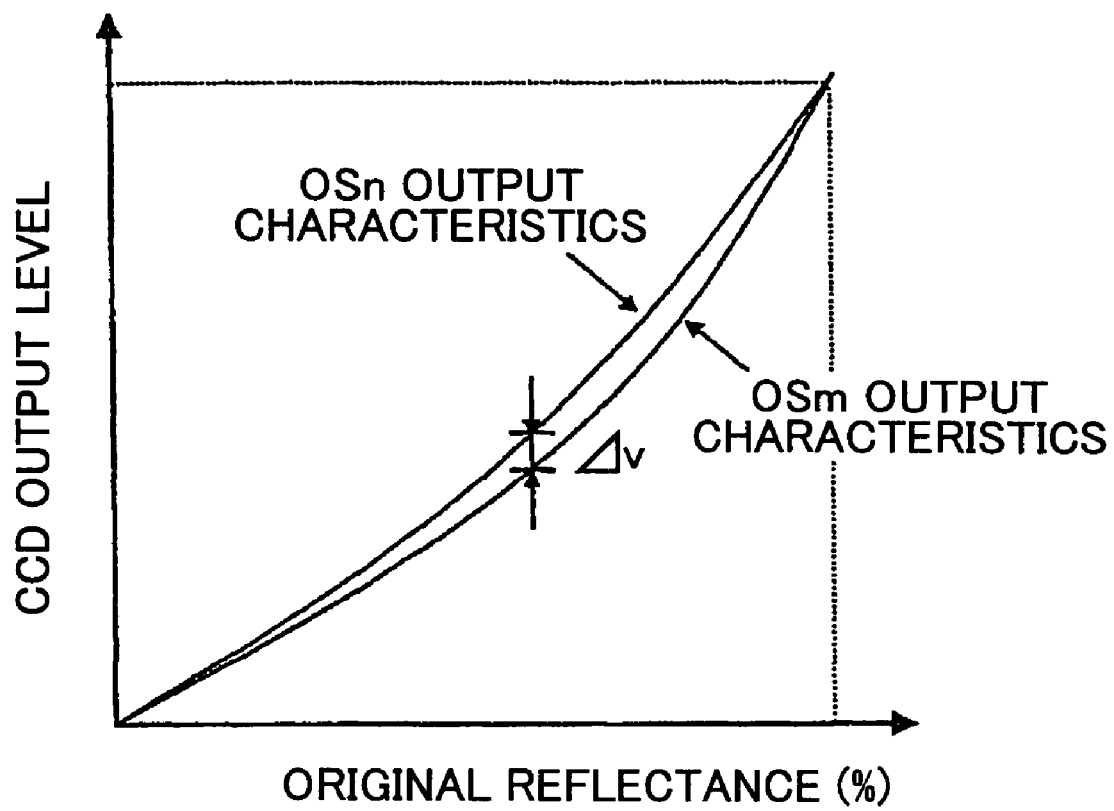
FIG. 5 shows characteristics illustrating that a difference in linearity among CCD shift registers cannot be corrected by shading correction.

In the image reading apparatus configured as mentioned above, in order to achieve a high reading speed, four series (i.e., two series (even-numbered pixels and odd-numbered pixels) of a first half and other two series (even-numbered pixels and odd-numbered pixels) of a second half) of analog shift registers 23 are employed in the CCD image sensor on the image reading circuit substrate 14 (see FIG. 2).

In this configuration, any one of two original reading systems may be selected, i.e., a first system (flat bed system) in which, when an original 5 is placed on the contact glass 1, the lamp 7 is lit, and the first and second carriages 9 and 12 are moved in a right direction by means of the scanner driving motor; and a second system (sheet through system) in which the lamp 7 is lit, the first and second carriages 9 and 12 are left unmoved, and an original 6 is conveyed by means of an original conveying device 4. In the flat bed system, shading correction data is generated previously as a result of data of the standard white plate 3 being obtained, before the original 5 is read. After the generation of the shading correction data, in parallel to the original reading operation in which the original reading area is scanned, shading correction processing is carried out.

In the sheet through system, in prior to actually reading the original 6, the first the carriage is moved to below the standard white plate 3, shading correction data is thus generated, the carriage is returned to a sheet through reading position, the original is conveyed as mentioned above and thus, the original reading operation is started. Configurations and operation of other parts are the same as those in the related art except those described later in particular.

Figure 6:
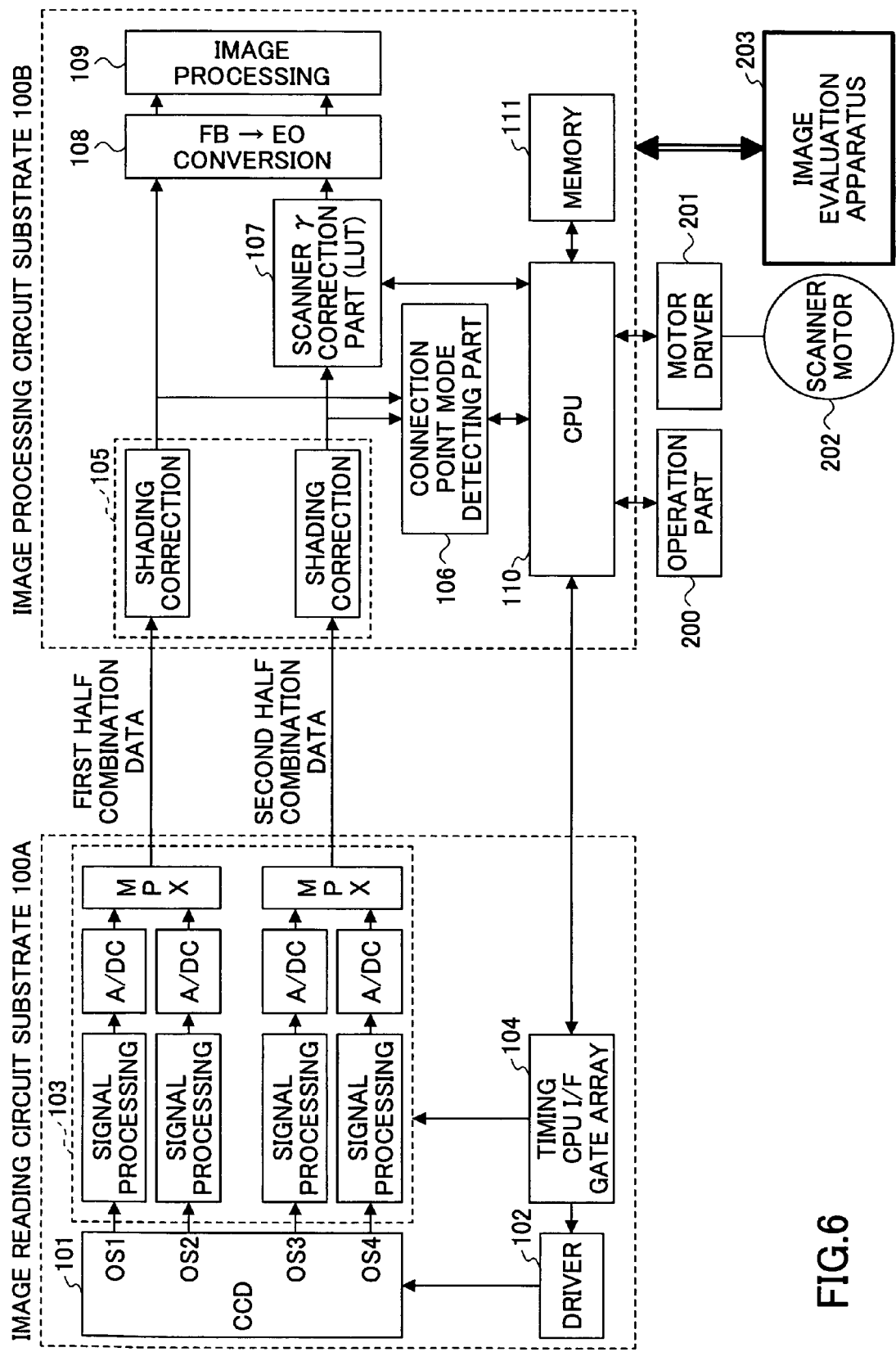
FIG. 6 shows a block diagram showing a configuration of an image reading circuit substrate and an image processing circuit substrate in the first embodiment of the present invention.
Figure 7:
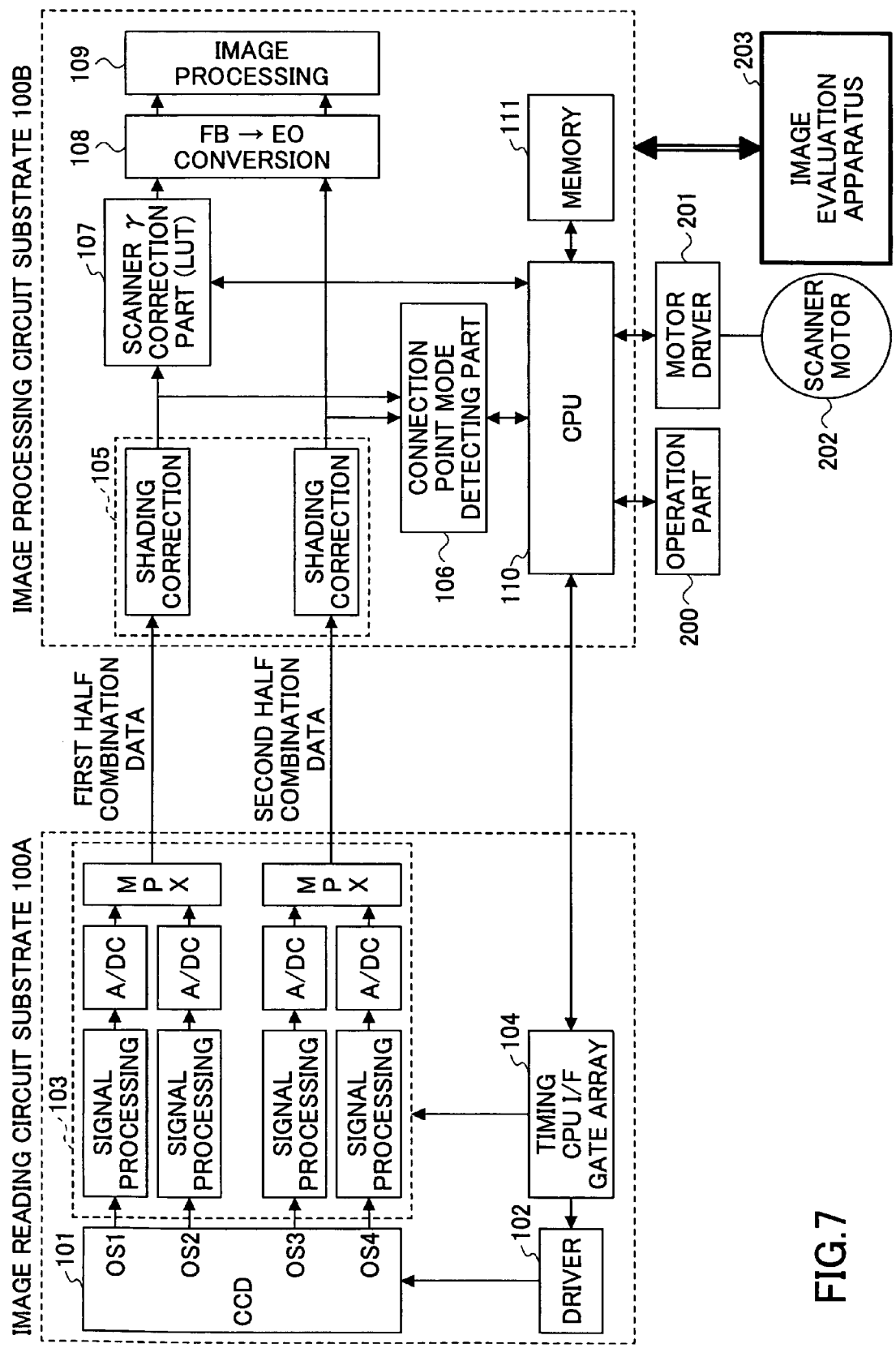
FIG. 7 shows another example of a block diagram showing a configuration of an image reading circuit substrate and an image processing circuit substrate in the first embodiment of the present invention.

FIGS. 6 and 7 show block diagrams of a configuration of the image reading circuit substrate and image processing part according to the present embodiment. In these figures, the image reading circuit substrate 100A (corresponding to the image reading circuit substrate 14 mentioned above) includes a CCD 101 carrying out photoelectric conversion of light reflected from the original; a signal processing part 103 carrying out amplification of the analog output signals from the CCD 101, and A-D conversion; a gate array 104 generating driving timing for the CCD 101; a CCD driving driver 103, and so forth. The signal processing part 103 carries out black offset adjustment, gain adjustment and so forth, generates data which is a combination of image data from even-numbered pixels and odd-numbered pixels of the first half and image data from even-numbered pixels and odd pixels of the second half, and transmits the same to an image processing circuit substrate 100B.

In the image processing circuit substrate 100B, shading correction is carried out on the thus-transmitted image data by a shading correction part 105; and after that, a scanner γ correction part 107 carries out scanner γ correction (i.e., linearity correction) on any one of the first half combination data (in the case of FIG. 7 in which the scanner γ correction part 107 is provided for the first half combination data) or the second half combination data (in the case of FIG. 6 in which the scanner γ correction part 107 is provided for the second half combination data). Thereby, reading level difference between the first half image data and the second half image data is corrected. Thus, any one of the combination data (combination of the even-numbered pixels and the odd-numbered pixels) of the first half and the second half is made to undergo the scanner γ correction. Therefore, it is possible to achieve effective correction by means of the minimum necessary correction part (linearity correction part or scanner γ correction part (LUT)).

After the scanner γ correction, the separate data of the first half (the even-numbered pixel and odd-numbered pixels combined data) and the second half (also the even-numbered pixel and odd-numbered pixels combined data) is converted into that in a data format of the even-numbered pixels and the odd-numbered pixels by means of an FB→EO conversion part 108. After that, various sorts of image processing is carried out by means of an image processing part 109. It is also possible that the scanner γ correction is carried out after the data format conversion (FB→EO) is carried out.

An operation panel (part) 200 is provided for an operator (user) to input various sorts of operation in the image reading apparatus. Therewith, the operator can make various sorts of setting in the image reading apparatus. A CPU 110 carries out control of the image processing circuit substrate 100B as a result of executing a program stored in a memory 111. Also, the CPU 110 controls the scanner motor 202 to drive the carriages 9 and 12 through a motor driver 201. An image evaluation apparatus 203 is connected to the image processing circuit substrate 100B. The image evaluation apparatus 203 may carry out linearity correction, interpolation calculation to correct defect data, if any, and so forth. Instead of the image evaluation apparatus, 203, the necessary processing may be actually carried out by the CPU 110 after an evaluation result is given to the CPU 110 by the image evaluation apparatus 203.

In regular image reading operation, the scanner γ correction is carried out in addition to the other image data processing mentioned above. When a predetermined operation mode is selected from the operation panel 200 by the user to carry out scanner γ correction value calculation, a gray scale chart is read, the scanner γ correction values are calculated, and the thus-obtained correction values are stored, automatically by the image processing circuit substrate 100B.

Figure 8:
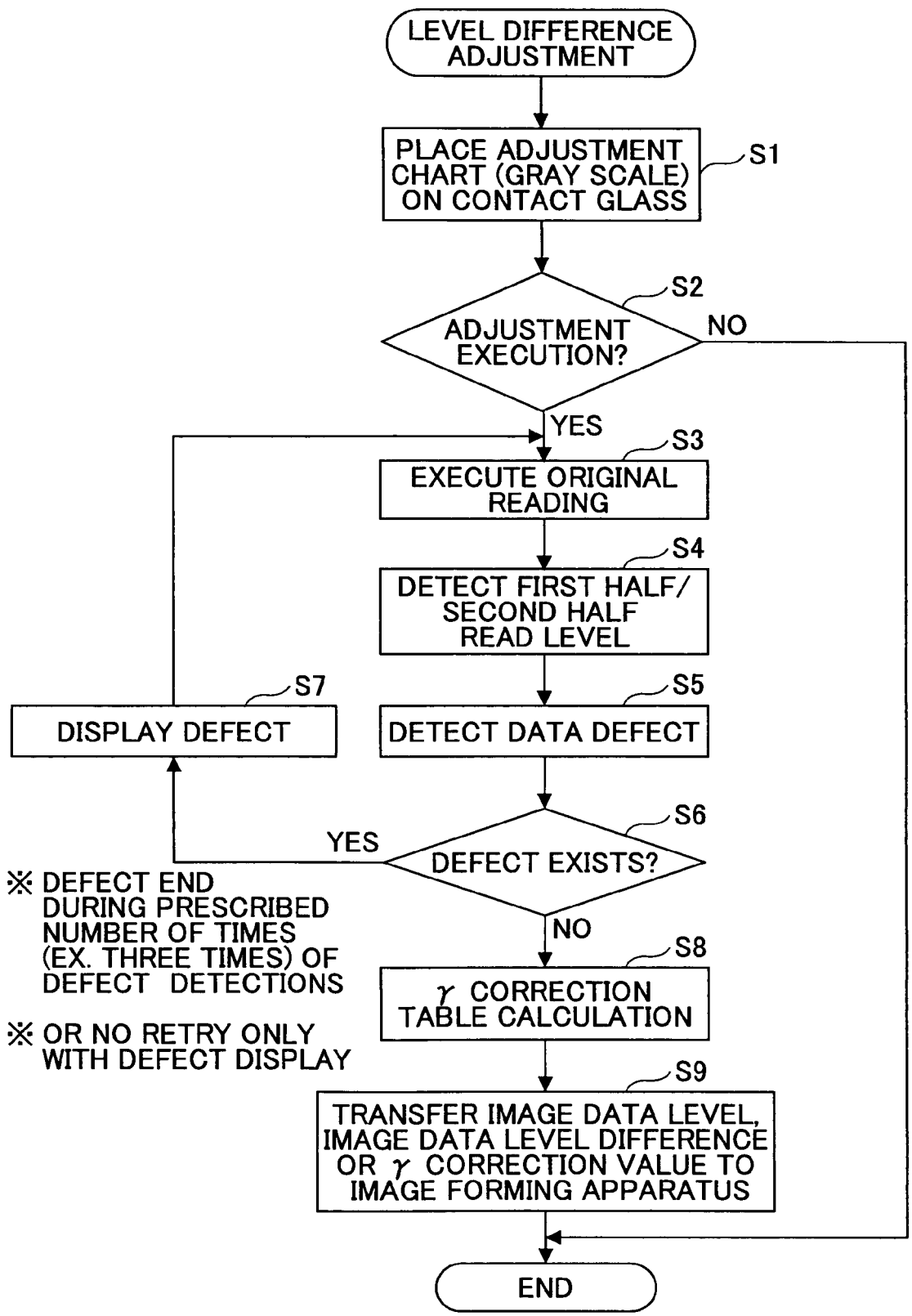
FIG. 8 shows a flow chart of level difference adjustment data (scanner γ correction values) setting processing.
Figure 9:
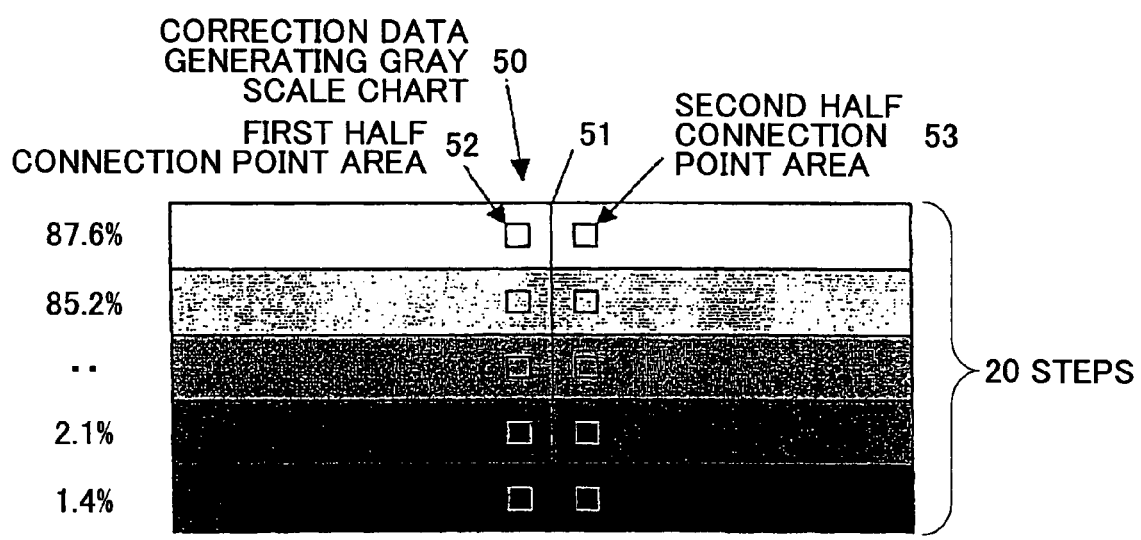
FIG. 9 shows one example of an adjustment chart (gray scale chart)

FIG. 8 shows an operation flow chart in an example of a control procedure to obtain the scanner γ correction values for adjusting a level difference between the first half and the second half of the CCD 101 (this operation is referred to as the scanner γ correction value calculation operation). In this processing procedure, after the scanner γ correction value calculation mode is selected from the operation panel 200 as mentioned above, a message is displayed on the operation panel 200 to confirm whether or not the adjustment chart (i.e., the above-mentioned gray scale chart) 50 is already placed on the contact glass 1 (Step S1). FIG. 1 (b) shows a state in which the gray scale chart 50 is thus placed.

After the placement of the adjustment chart (gray scale chart) 50 is confirmed, when an adjustment execution start instruction is given by the operator via the operation panel 200, the image reading apparatus executes scanning operation on the gray scale chart 50 via the contact glass 1 (Step S3), and the image processing circuit substrate 100B detect image data levels at a connection point 51 between the first half and the second half of the gray scale chart image (Step S4), which are thus read by the image reading circuit substrate 100A. The image data levels of the connection points 52 and 53 of the gray scale chart 50 to detect are obtained from calculation for a 100×100 pixel average level for example of the EO (even-numbered/odd-numbered pixels) combination data of the first half and the second half for each of the respective 20 tones of the gray scale chart 50.

The calculation is corrected on an assumption that the γ converted data of one of the first half and the second half, which one is regarded as a standard, is linear. In other words, the correction is made only on the image data other than that which is thus regarded as the standard of the first half and the second half. Assuming that the read data of the gray scale chart (for example, total 20 tones) 50 has FD(1), FD(2), FD(19), FD(20) (first half), BD(1), BD(2), . . . , BD(19), BD(20) (second half), such a scanner γ condition table is generated that the above-mentioned input data BD(n) is corrected into the above-mentioned output data FD(n), for a case where the first half is regarded as the standard, and therewith, the scanner γ correction is carried out on the combination data of the even-numbered pixels and odd-numbered pixels of the second half in this case.

At this time, a determination is carried out as to whether or not a defect in image data level exists in the thus-detected first half and second half image data FD(n) and BD(n) (Step S5). In one example of a method of detecting a defect, it is determined that the detected image data has a defect (Yes in Step S6) if a difference, from that of the adjusted tones, of a difference between the first half data and the second half data, is more than a prescribed value, for example, a standard deviation of the difference is not less than 2, or the differential data is not less than three times of the average of all the difference values. When it is determined that a defect exits, a defect indication or a retry is carried out (Step S7). When the retry is carried out, a setting may be made such that, the processing starting from Step S3 is repeated a predetermined number of times (for example, three times), and, when a defect is still detected after that, the processing is finished. Alternatively, the image data level detected to have a defect may be replaced by data obtained from interpolation with the adjustment image data levels. Such interpolation calculation is carried out in the image evaluation apparatus 203.

Figure 11:
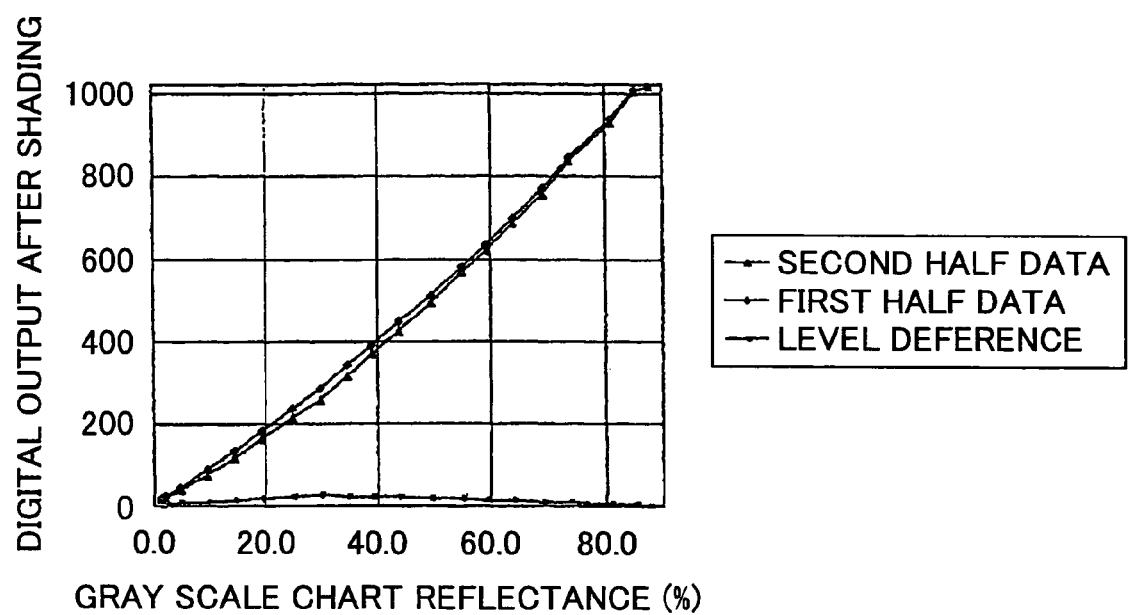
FIG. 11 shows first half/second half connection point average data (data plot of FIG. 10) obtained when the gray scale chart is read.
Figure 12:
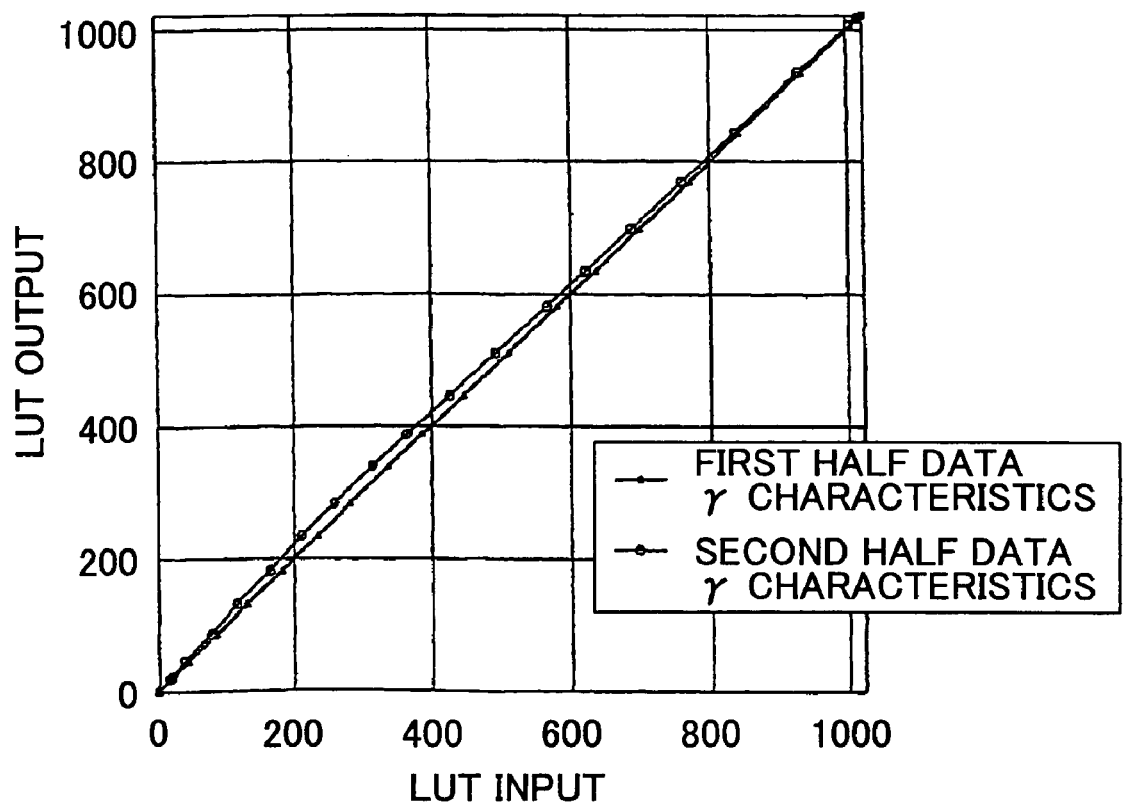
FIG. 12 shows a first half/second half connection point scanner γ correction data obtained as a result of the gray scale chart being read.
Figure 14:
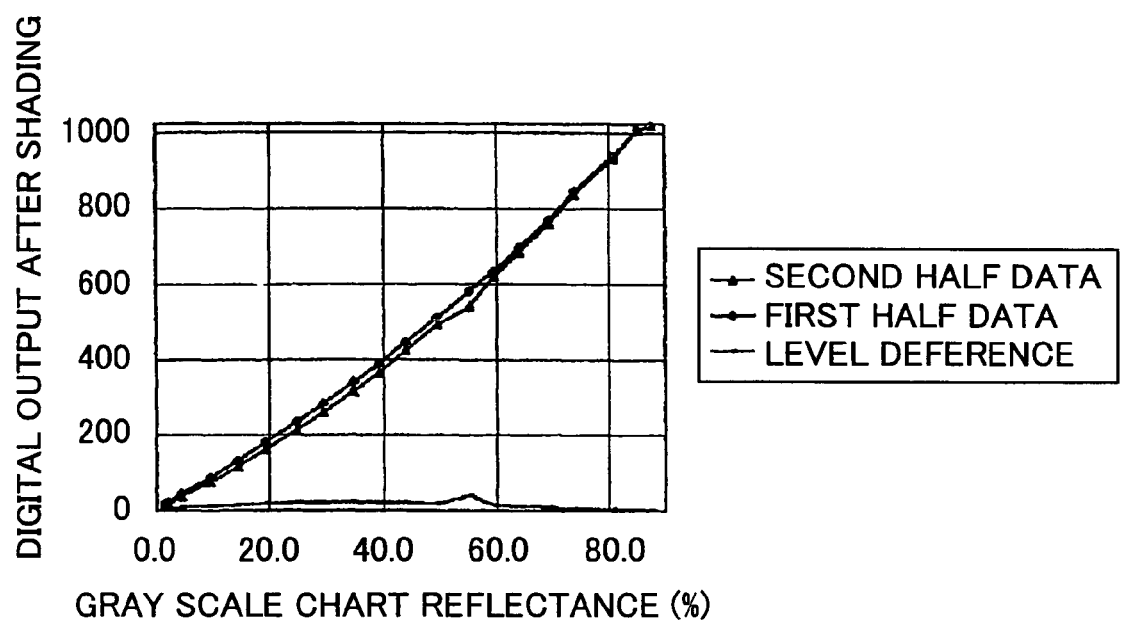
FIG. 14 shows the first half/second half connection point average data obtained when the gray scale chart is read on the occasion where the defect occurs.
Figure 16:
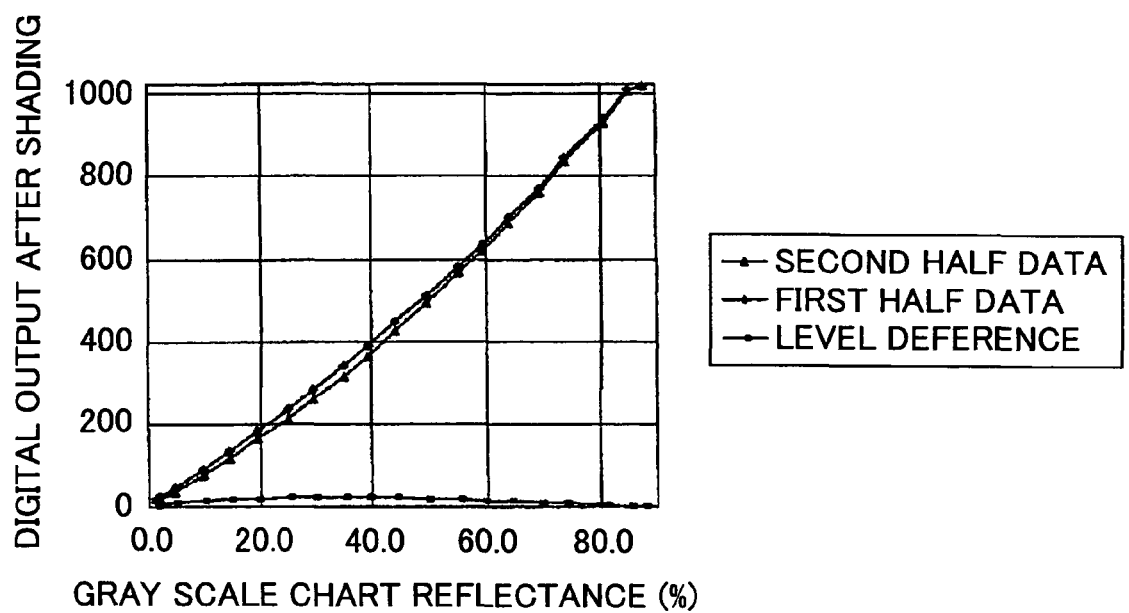
FIG. 16 shows a plot of the interpolation data shown in FIG. 15.

FIGS. 10 and 11 show examples of read levels of the original reflectance thus detected. FIG. 12 shows scanner γ characteristics thus obtained therefrom. FIGS. 13 and 14 show examples for when a defect exits in the detected data due to a stain or such on the gray scale chart 50. FIGS. 10 and 13 show the reflectance, first half data, second half data, level difference therebetween and a difference in the level difference. FIGS. 11 and 14 show plots of the numerical values of FIGS. 10 and 13. Based on these values, a defect detection condition is set previously, and when the defect detection condition is met, it is determined that a defect exists. FIGS. 15 and 16 shows examples in which image data levels detected as having a defect are replaced by adjustment image data levels. In the examples, the defective condition appearing in FIG. 13, i.e., the reflectance is 55.2%, the level difference is 40, and the difference in the level difference is 25, is corrected into the condition of FIG. 15 in which the level difference is 17 and the difference in the level difference is 2, by means of the above-mentioned interpolation calculation.

Then, based on the thus-obtained first half and second half image data levels, the scanner γ correction data for each tone is generated according to a predetermined reading resolution (for example, 10 bit: 1024 tones) (Step S8). Next, the corrected image data levels, the image data level difference, or the thus-calculated scanner γ correction values themselves are transferred to the image reading apparatus (i.e., the image processing circuit substrate 100B) (Step S9). It is noted that the scanner γ correction data thus calculated in Step S8 is used as the LUT such as that shown in FIG. 12. At this time, as to output data of the LUT corresponding to that between adjacent tones, the data is calculated by interpolation of the respective adjacent read tone data. Specifically, any method, i.e., linear interpolation between the adjacent read data, a least square method, or such, may be applied for this purpose. The thus calculated scanner γ correction data is stored in the memory 111, and, after the adjustment (i.e., the scanner γ correction data (value) calculation) is finished, the scanner γ correction is actually carried out based on the scanner γ correction data, which is read from the memory 111 by the scanner γ correction part 107, when power supply to the machine is started up on a later occasion of actual original image data reading operation.

The data stored in the memory 111 may be the scanner γ correction data for all the tones including those obtained by the above-mentioned interpolation calculation. However, instead, the image data levels read from the gray scale chart may be stored, and, when power supply is started up in the machine on a later occasion of actual original image data reading operation, the scanner γ correction table may be calculated therefrom, and may be set in the LUT of the scanner γ correction part 107. As a result, it is possible to reduce a required storage capacity of the memory 111.

Figure 17:
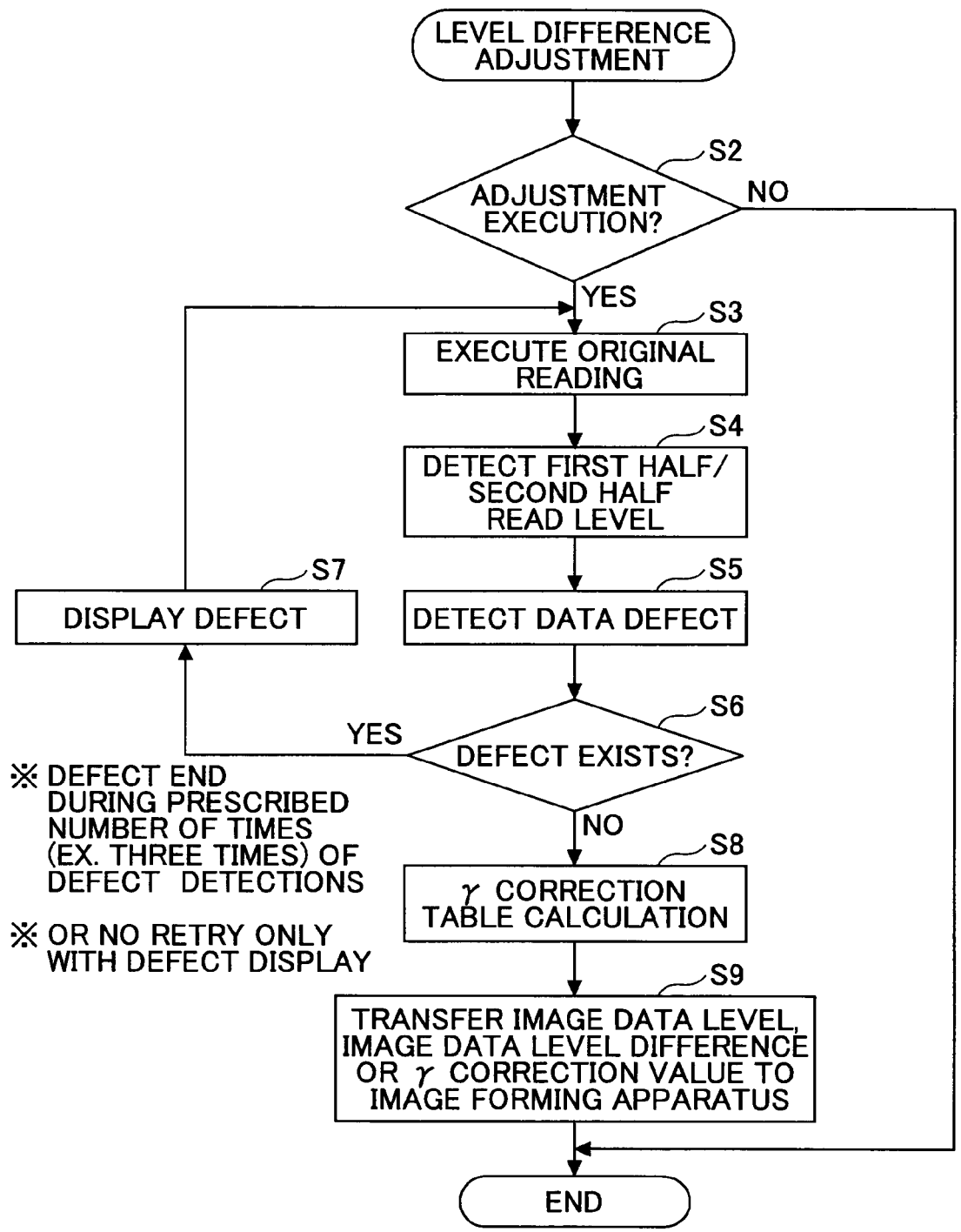
FIG. 17 shows a flow chart of another procedure of the level adjustment data (scanner γ correction values) setting processing.

Further, when the gray scale chart 50 is originally assembled in the image reading apparatus, the Step S1 of placement of the gray scale chart may be omitted from the flow chart of FIG. 8. FIG. 17 shows a flow chart for this case. Further, the light quantity of the lamp may be made variable for the purpose of carrying out the same process as that carried out as if the gray scale chart is read. Further, the light quantity charge time may be changed thanks to an electronic shutter function of the CCD for this purpose.

Further, by means of this correction, a CCD, which even may have a defect, and thus, should have been replaced by a new product in the prior art, may be used so that, it is advantageous in an environmental view point.

Figure 18:
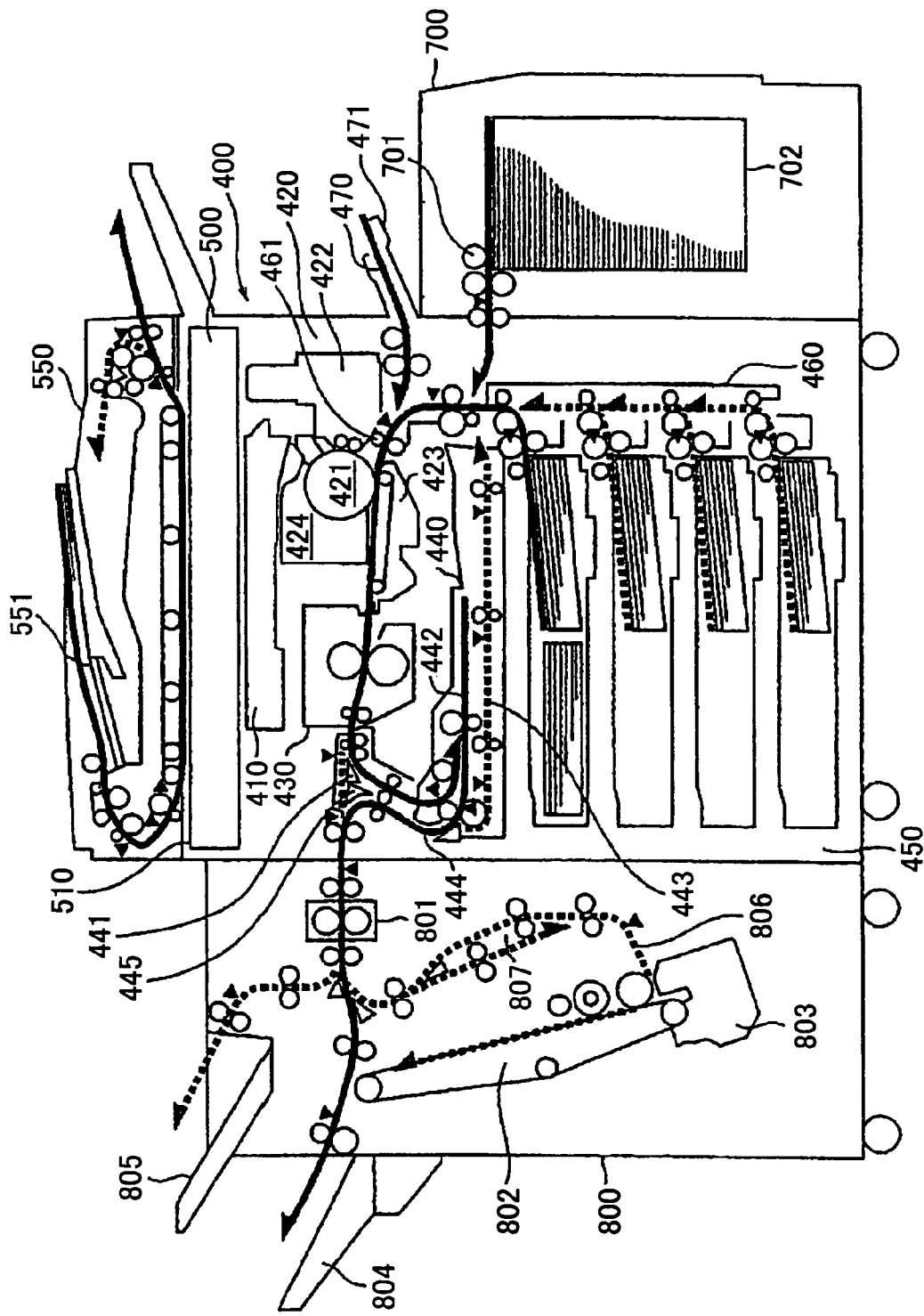
FIG. 18 shows one example of an image forming apparatus employing the image reading apparatus according to the first embodiment of the present invention.

FIG. 18 shows a general structural view of a digital copier, acting as an image forming apparatus employing an image reading apparatus corresponding to the image forming apparatus shown in FIG. 1 according to the first embodiment of the present invention. In FIG. 18, the digital copier is for monochrome image forming, and generally includes a body 400, the image reading apparatus 500 according to the embodiment of the present invention, set on th top of th image forming apparatus body 400, an automatic draft feeding apparatus (simply referred to as an ADF, hereinafter) 550 mounted further thereon, a large quantity paper feeding apparatus 700 mounted on the right side of the image forming apparatus body 400 in the figure, and a paper post processing apparatus 800 set on the left side of the image forming apparatus body 400.

The image forming apparatus, the body 400 includes an image writing part 410, an image forming part 420, a fixing part 430, a both side conveying part 440, a paper feeding part 450, a vertical conveying part 460, and a manually (paper) inserting part 470.

The image writing part 410 modulates an LD which is a light source, based on image information of an original read by means of the image reading apparatus 500, and writes the same on a photosensitive drum 410 by laser light with the use of a scanning optical system such as a polygon mirror, an fθ lens, and so forth. The image forming part 420 includes the photosensitive body 421, and a well-known electrophotographic image forming elements such as a developing unit 422, a transfer unit 423, a cleaning unit 424, an electricity removal unit and so forth, provided along an outer periphery of the photosensitive drum 421.

The fixing unit 430 fixes an image, once transferred to the above-mentioned transfer unit 423, into a transfer paper. The both side conveying part 440 is provided on a transfer paper conveyance direction downstream side of the fixing part 420, and has a first switching claw for switching a conveyance direction of the transfer paper between to a side of the paper post processing part 800 and to a side of the both side conveyance part 440; an inverting conveyance path 442 to which the transfer paper is led by means of the first switching claw; an image forming side conveyance path 443 for conveying the transfer paper once inverted by the inverting conveyance path 442 to a side of the transfer unit 423 again; and a post processing side conveyance path 444 for conveying the transfer paper to a side of the paper post processing apparatus 800. A second switching claw 445 is provided at a branching part for the image forming side conveyance path 443 and the post processing side conveyance path 444.

The paper feeding part 450 includes four paper feeding stages, from which transfer paper is selected and drawn out by means of a pickup roller and a paper feeding roller, from those held by the respective paper feeding stages, and the thus picked up transfer paper is led to the vertical conveyance part 460. In the vertical conveyance part 460, the thus-picked up transfer paper is conveyed to a registration roller pair 461 immediately before a paper conveyance direction upstream side of the transfer unit 423. The registration roller pair 461 provides the transfer paper to the transfer unit 423 in timing with the top end of a developed image on the photosensitive drum 421. The manually inserting part 470 is provided with a manually inserting tray 417, which can be opened/closed, for providing the transfer paper to the transfer unit as is necessary. Also in this case, the registration roller pair 461 conveys the transfer paper in an appropriate timing.

The large quantity paper feeding apparatus 700 stacks a large quantity of transfer paper in one size, and provides the same. There, as the transfer paper is consumed, a bottom plate 702 is lifted accordingly, and thus, picking up of the paper can be airways ensured by means of a pickup roller 701. The transfer paper fed by the pickup roller 701 is conveyed to the nip of the registration roller pair 461 through the vertical conveyance part 460.

The paper post processing apparatus 800 carries out predetermined processing such as punching, alignment, stapling, sorting or such, on the already printed transfer paper. In this embodiment, for this purpose, a punch 801, a staple (alignment) tray 802, a stapler 803 and a shift tray 804 are provided. That is, the transfer paper conveyed from the image forming apparatus 400 undergoes punching, sheet by sheet, if necessary, by means of the punch 801, and after that, is ejected to a proof tray 805; or, is ejected to a shift tray 804 if sorting and stacking is carried out. The sorting is carried out as a result of the shift tray 804 moving reciprocally for a predetermined amount in a direction perpendicular to the paper conveyance direction. Other than this, the paper conveyance path may be used for this purpose and a part of the path may be moved in a direction perpendicular to the paper conveyance direction.

When the alignment is carried out, the transfer paper is led to a bottom conveyance path 806, an end thereof along the direction perpendicular to the paper conveyance direction is aligned by means of a rear end fence, and an end thereof parallel to the paper conveyance direction is aligned by means of a jogger fence. When the stapling is carried out, a predetermined position, for example, a corner, or central two positions of an edge of the thus aligned transfer paper sheaf is stapled, and after that, a discharging belt is used to eject the thus-processed transfer paper to the shift tray 804. Further, a pre-stack conveyance path 807 is provided in the bottom conveyance path 806, whereby a plurality of sheets of the paper on conveyance are stacked, and thus, interruption of the image forming operation in the image forming apparatus 400 can be avoided.

In the image reading apparatus 500, corresponding to the above-described image reading apparatus in the first embodiment of the present invention shown in FIG. 1 (*b*), an original placed on a contact glass 510 fed by the ADF 600 is optically scanned, and, a thus-taken image, which is formed by means of first through third mirrors and an imaging lens, is read in, by means of a photoelectric converting device such as CCD or a CMOS. The thus-read image data is then processed by an image processing circuit such as the image reading circuit substrate 100A and the image processing circuit substrate 100B, described above with reference to FIGS. 6 and 7, and then is once stored in a storage device. Then, when image forming is carried out therefrom, the image writing part 410 reads the stored image data, modulates the laser, and carried out optical writing as described above.

The ADF 550 has a both side reading function, and is provided on a surface of the contact glass 510 of the image reading apparatus 500 in such a manner that it can be opened/closed. In the ADF 550, an original placed on an original placement table 551 is automatically conveyed into on the contact glass 510 when the original is read.

The above-mentioned image reading apparatus according to the first embodiment of the present invention may be employed by, not only the digital copier as described above, but also, in a digital multi-function machine, a facsimile machine, a scanner, and so forth.

Thus, according to the first embodiment of the present invention, 1) reliability of scanner γ correction data can be improved since it is determined whether or not a defect exists in a detection result of level detection by which image data levels are detected for respective output directions of a first half and a second half at a connection point therebetween of data which includes respective combinations of the respective output directions of the first half and the second half which is to be corrected.

2) Then, when it is determined that the detected image data levels include a defect, the detected image data is corrected, and thus, probable correction can be achieved.

3) When it is determined that the detected image data levels include a defect, a defect indication is carried out, and a retry is carried out. The defect indication may urge an operator to analyze for a cause of the defect.

4) By means of interpolation calculation from actual data read from the gray scale chart which has a limited number of tones, it is possible to obtain required tone correction data (i.e., the scanner γ correction data).

Second Embodiment

A second embodiment of the present invention is described now.

The second embodiment of the present invention allows for inspection of an image and obtaining corrected data by the image evaluation apparatus 203 alone, when the image evaluation apparatus 203 in the first embodiment described above is assembled in a factory. As a result of the verification is thus made in the assembling process, it is possible to confirm, in an earlier stage, whether or not a defect is included in the product. The image reading apparatus itself is the same as that in the above-described first embodiment, duplicate description is omitted, and only different points will now be described.

The image evaluation apparatus 203 according to the present embodiment is connected with the image reading apparatus after the manufacturing of the image reading apparatus is finished, in a factory assembling line. In order to carry out correction of the above-mentioned connection point of data which is a combination of even-numbered pixels and odd-numbered pixels of the first half and the second half, the image evaluation apparatus 203 obtains image data from the image processing circuit substrate 100B, calculates the scanner γ correction values, and checks the correction result. Further, scanning operation control for obtaining image data, the scanner operation itself being actually carried out in the image reading apparatus, is carried out according to instructions provided by the image evaluation apparatus 203.

Actual correction of the connection point image data levels, creation of the above-mentioned scanner γ correction table and so forth are the same as those described above for the first embodiment. Accordingly, except that the control is carried out according to instructions provided by the image evaluation apparatus 203 as mentioned above, a control procedure the same as that of FIG. 8 or 17 is carried out. The calculated scanner γ correction data or the gray scale chart read data levels are transferred to the image processing circuit substrate 100B of the image reading apparatus from the image evaluation apparatus 203. When the image evaluation apparatus 203 does not have a memory, the data is stored after being converted into a visible form of barcode or such. Then, after the image evaluation apparatus 203 is assembled in an image forming apparatus together with the image reading apparatus, the thus-stored data is transferred to the image reading apparatus. This data transfer is carried out as a result of the visible form of the stored data being read. The calculated scanner γ correction data or the read data levels are thus transferred to the image processing circuit separate 100B of the image reading apparatus from the image evaluation apparatus 203, is then stored in the memory of the image processing circuit substrate 100B. Then, when power supply of the image forming apparatus is started up at a later occasion, the scanner γ correction table is calculated therefrom, and set in the LUT. As a result, it is possible to minimize the required memory size.

Operation of obtaining image data from the image processing circuit substrate 100B, calculation of the scanner γ correction values, checking the correction result, and so forth, is carried out by a CPU (not shown) provided in the image evaluation apparatus 203, separately from the CPU 110 of the image processing circuit substrate 100B.

Other than the above, the operations of the image evaluation apparatus 203 and the image reading apparatus are the same as those of the first embodiment described above.

Thus, according to the second embodiment of the present invention, 1) check of image data and obtaining correction data are carried out in the image evaluation apparatus 203 by itself alone in a process of assembling it with the image reading apparatus. Accordingly, it is possible to determine whether any defect exists in the image reading apparatus or the image evaluation apparatus in an earlier stage, and thus, productivity can be improved in a factory.

2) Inspection of image data and obtaining correction data can be carried out in the image evaluation apparatus 203 by itself alone in a process of assembling it with the image reading apparatus in a factory.

3) Obtaining correction data is carried out in the image evaluation apparatus 203 in a process of assembling it with the image reading apparatus, and the correction data is then transferred to the image reading apparatus. Accordingly, the correction data used for correcting the connection point image data levels can be obtained in an earlier stage.

Third Embodiment

A third embodiment of the present invention will now be described.

Figure 19:
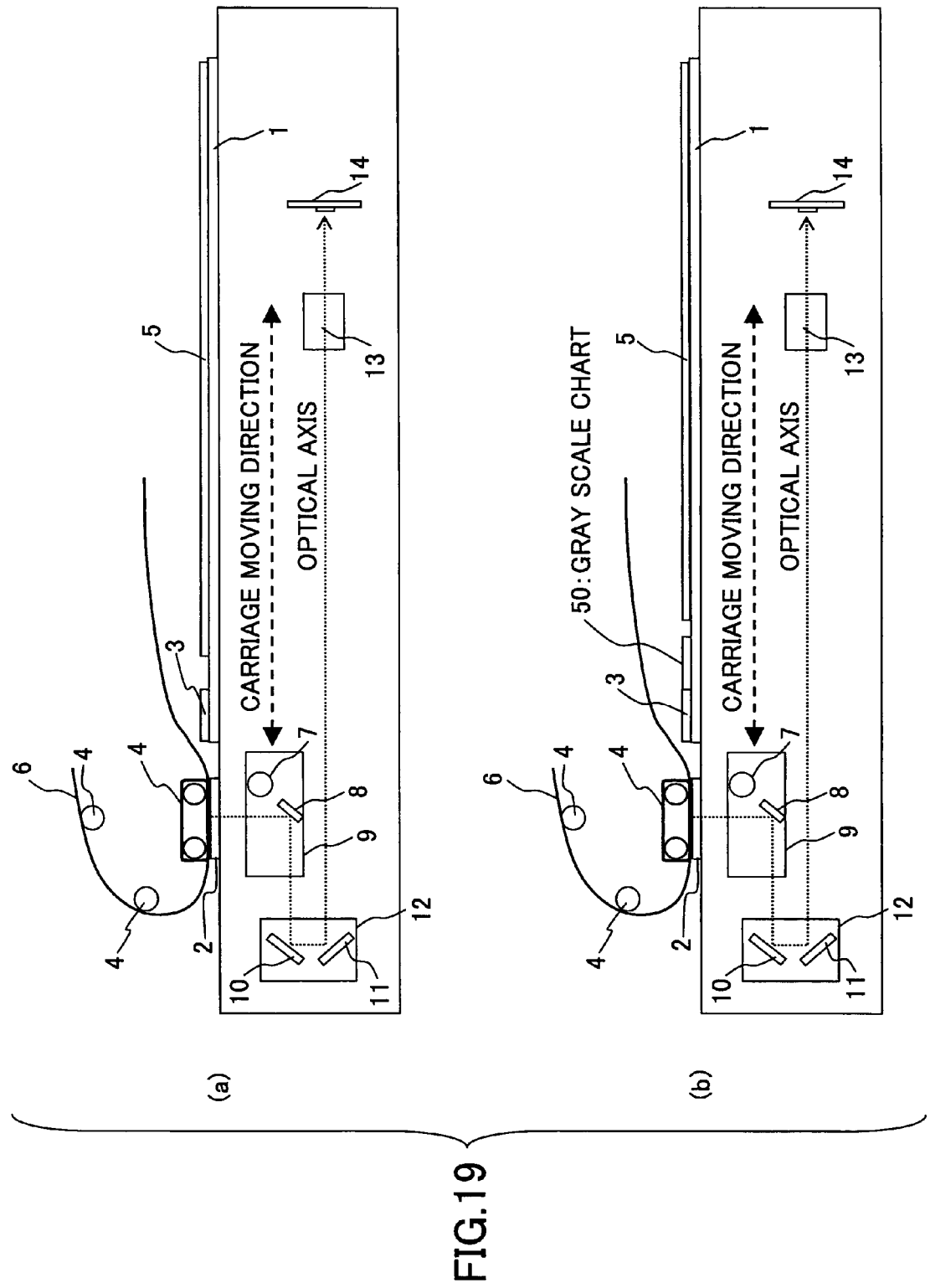
FIG. 19 shows a general view of one example of an image reading apparatus in the related art (a); and a state in which, in an image reading apparatus according to a third embodiment of the present invention, a gray scale chart is placed on a contact glass (b)

According to the third embodiment of the present invention, an image reading apparatus 100 is configured, the same as that shown in FIG. 19 (*a*) in the related art (the same as that shown in FIG. 1 (*a*)). That is, it includes a contact glass 1 on which an original is placed; a sheet through glass 2; a shading data generating standard white plate 3; a lamp 11 for lighting the original; a first carriage 9 on which a first mirror 8 is mounted; a second carriage 12 on which second and third mirrors 10 and 11 are mounted; a lens unit 13 with which an image is formed in a reduced manner on a CCD image sensor; an image reading circuit substrate 14 on which the CCD image sensor is mounted; a scanner driving motor (not shown) driving the first and second carriages; a home position sensor (not shown); an original detection sensor (not shown), and so forth.

Figure 20:
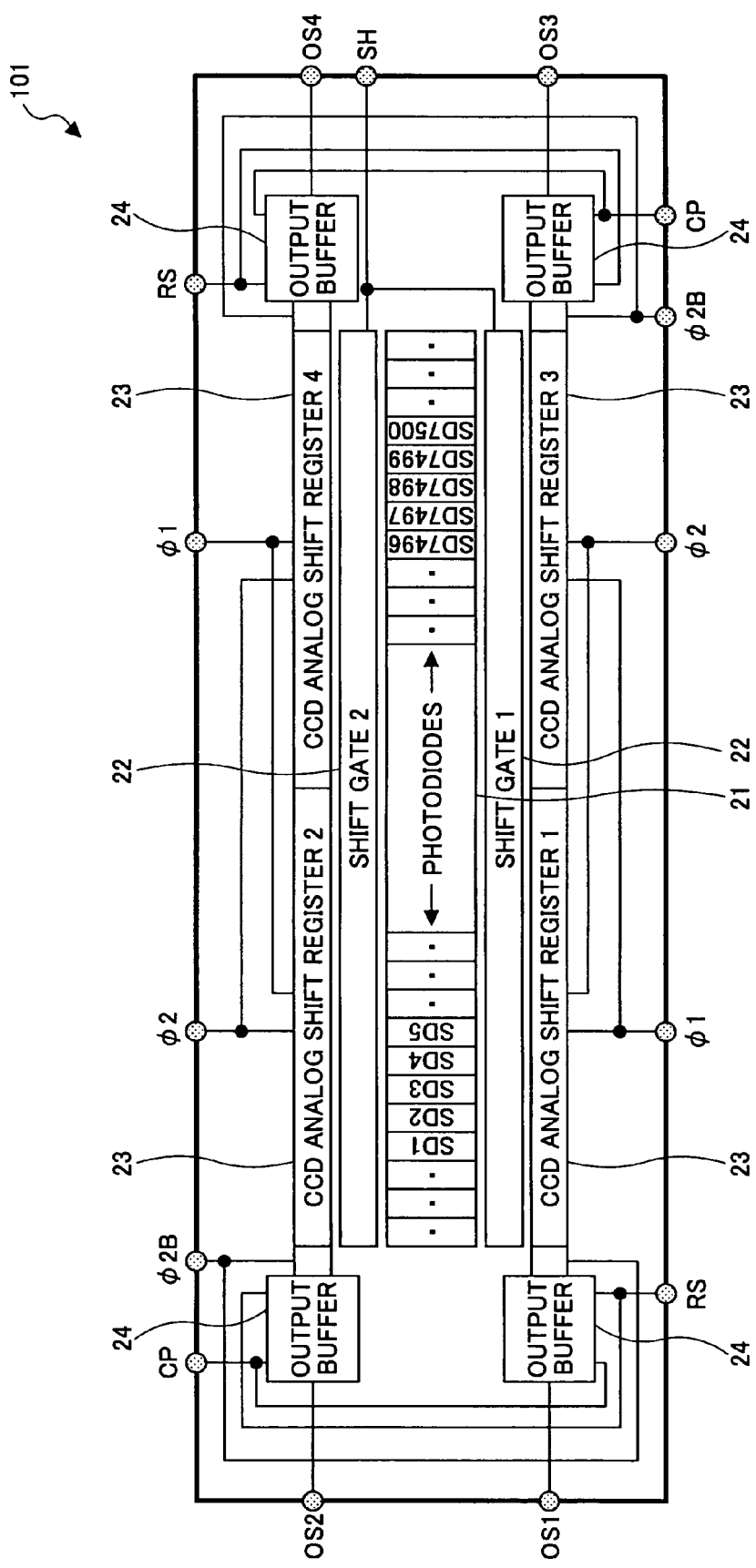
FIG. 20 shows a configuration of CCD shift registers in a type of four series in the third embodiment in which two series outputs are made from each of a first half and a second half of the CCD shift registers in the image reading apparatus.
Figure 21:
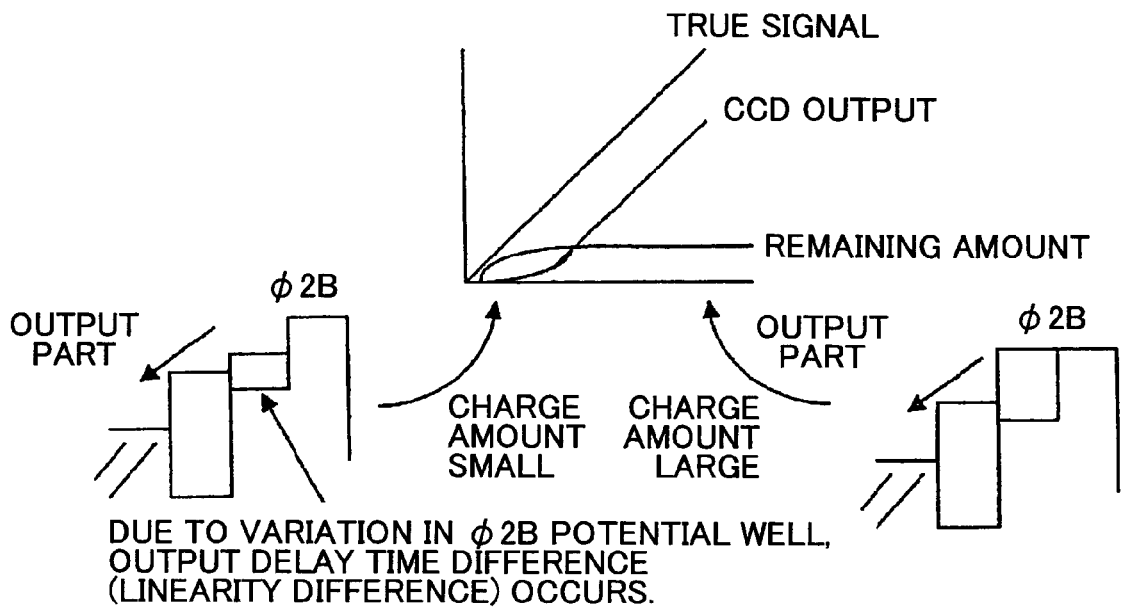
FIG. 21 shows a difference in CCD shift register outputs due to a variation in analog output delay time.
Figure 22:
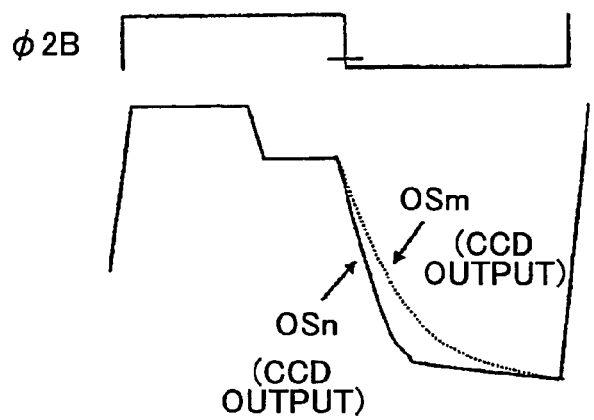
FIG. 22 shows a relationship between a driving waveform and linearity among CCD shift register outputs.
Figure 23:
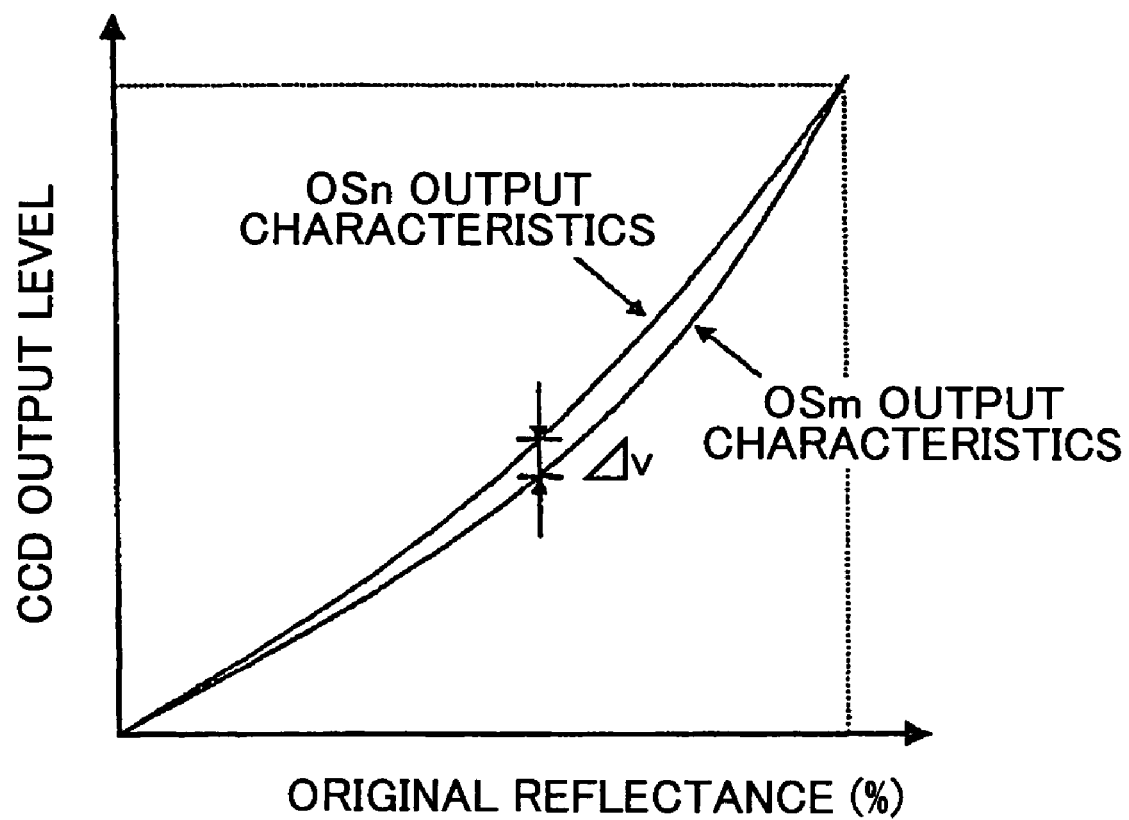
FIG. 23 shows characteristics illustrating that a difference in linearity among CCD shift registers cannot be corrected by shading correction.

In the image reading apparatus 100 configured as mentioned above, in order to achieve a high reading speed, four series (i.e., two series (even-numbered pixels and odd-numbered pixels) in a first half and other two series (even-numbered pixels and odd-numbered pixels) of a second half of analog shift registers 23 are employed in the CCD image sensor on the image reading circuit substrate 14 (see FIG. 20).

In this configuration, any one of two original reading systems may be selected, i.e., a first system (flat bed system) in which, when an original 5 is placed on the contact glass 1, the lamp 7 is lit, and the first and second carriages 9 and 12 are moved in a right direction by means of the scanner driving motor; and a second system (sheet through system) in which the lamp 7 is lit, the first and second carriages 9 and 12 are left unmoved, and an original 6 is conveyed by means of an original conveying device 4. In the flat bed system, shading correction data is generated previously as a result of data of the standard white plate 3 is obtained, before the original 5 is read. After the generation of the shading correction data, in parallel to the original reading operation in which the original reason area is scanned, shading correction processing is carried out.

In the sheet through system, in prior to actually reading the original 6, first the carriage is moved into below the standard white plate 3, shading correction data is thus generated, the carriage is returned to the sheet through reading position, the original is conveyed as mentioned above and thus, the original reading operation is started. Configurations and operation of other parts are the same as those in the related art except those described later in particular.

Figure 24:
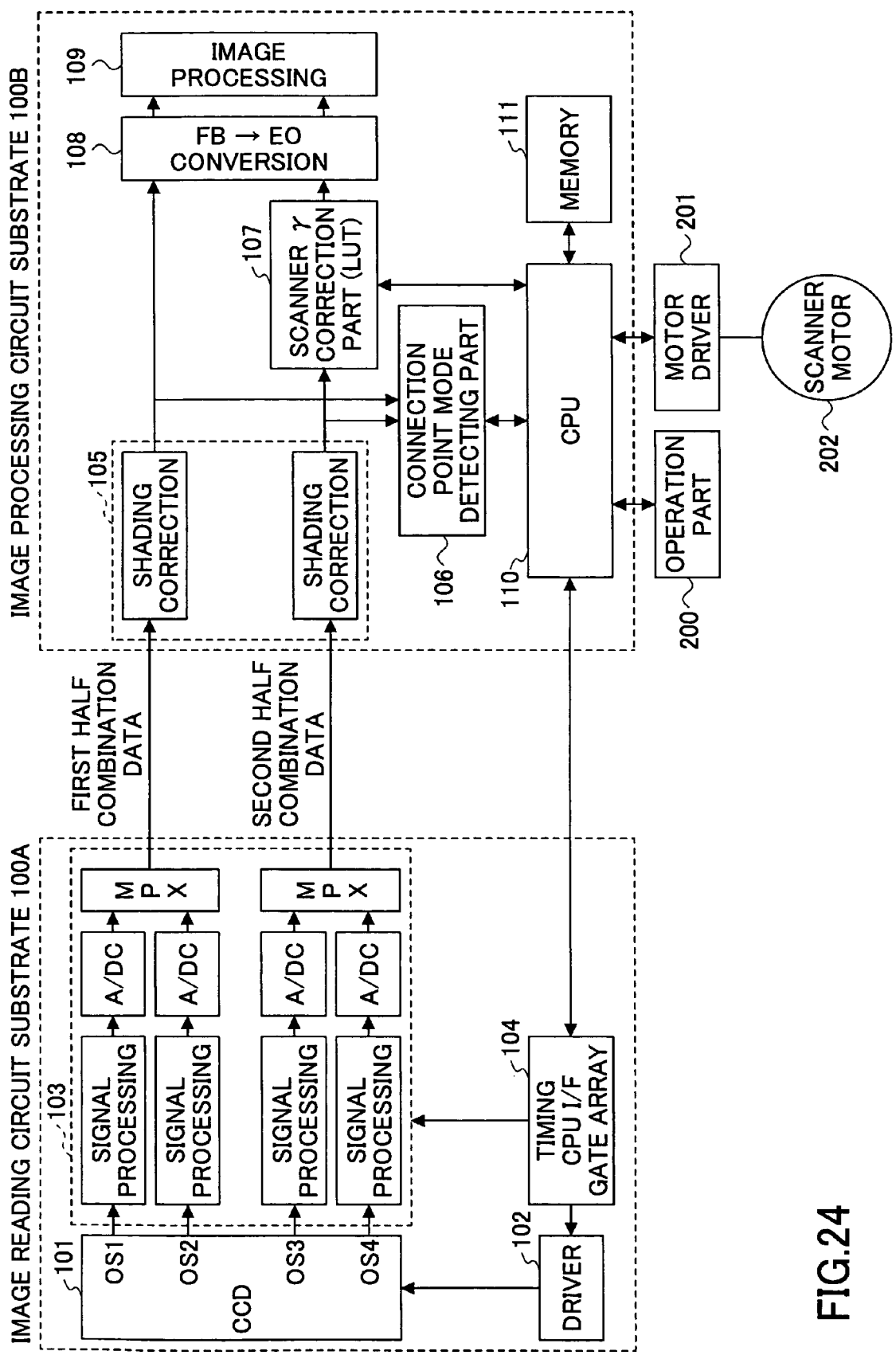
FIG. 24 shows a block diagram showing a configuration of an image reading circuit substrate and an image processing circuit substrate in the third embodiment of the present invention.
Figure 25:
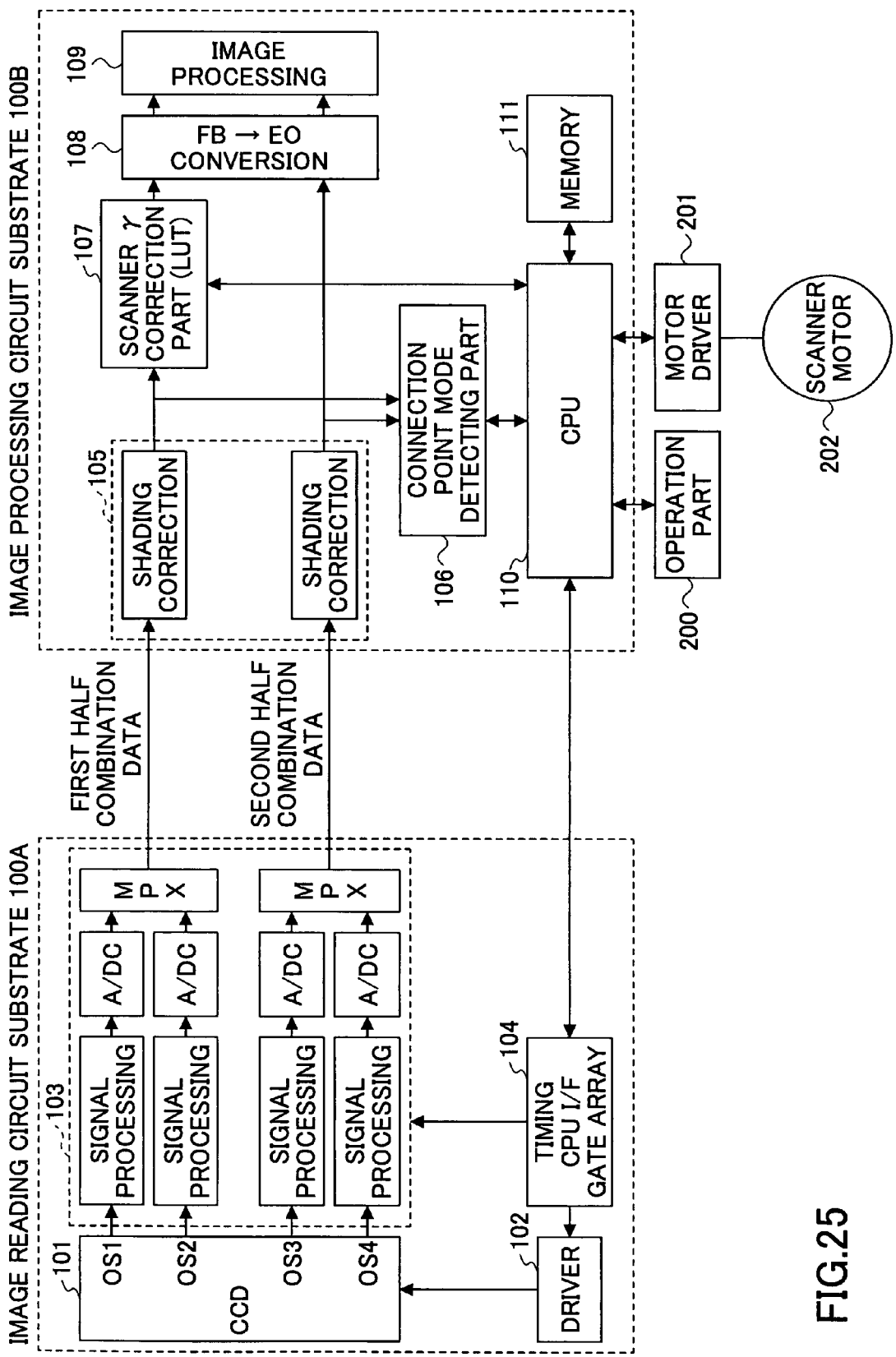
FIG. 25 shows another example of a block diagram showing a configuration of an image reading circuit substrate and an image processing circuit substrate in the third embodiment of the present invention in which the channels to carry out scanner γ correction are different from those of FIG. 24.

FIGS. 24 and 25 show block diagrams of a configuration of the image reading circuit substrate 100A and an image processing circuit substrate 100B according to the present embodiment. In these figures, the image reading circuit substrate 100A includes a CCD 101 carrying out photoelectric conversion of light reflected from the original; a signal processing part 103 carrying out amplification of analog output signals from the CCD 101, and A-D conversion; a gate array 104 generating driving timing for the CCDs 101; CCD driving drivers 103 and s forth. The signal processing part 103 carries out black offset adjustment, gain adjustment and so forth, generates data which is a combination of image data from even-numbered pixels and odd-numbered pixels of the first half and image data from even-numbered pixels and odd pixels of the second half, and transmit the same to the image processing circuit substrate 100B.

In the image processing circuit substrate 100B, shading correction is carried out on the thus-transmitted image data by a shading correction part 105; and after that, a scanner γ correction part 107 carries out scanner γ correction (i.e., linearity correction) on any one of the first half combination data (in the case of FIG. 25 in which the scanner γ correction part 107 is provided for the first half combination data) or the second half combination data (in the case of FIG. 24 in which the scanner γ correction part 107 is provided for the second half combination data). Thereby, reading level difference between the first half image data and the second half image data is corrected. Thus, any one of the combination data (combination of the even-numbered pixels and the odd-numbered pixels) of the first half and the second half is made to undergo the correction. Therefore, it is possible to achieve effective correction by means of the minimum necessary correction part (linearity correction part 107, i.e., a scanner γ correction part (LUT), described later with reference to FIG. 31).

After the scanner γ correction, the separate data of the first half (the even-numbered pixel and odd-numbered pixels combined data) and the second half (also the even-numbered pixel and odd-numbered pixels combined data) is converted into a data format of the even-numbered pixels and the odd-numbered pixels by means of an FB→EO conversion part 108. After that, various sorts of image processing is carried out by means of an image processing part 109. It is also possible that the scanner γ correction is carried out after the data format conversion (FB→EO) is carried out. An operation panel (part) 200 is provided for an operator (user) to input various sorts of operation in the image reading apparatus. Therewith, the operator can make various sorts of setting in the image reading apparatus. A CPU 110 carries out control of the image processing circuit substrate 100B as a result of executing a program stored in a memory 111. Also, the CPU 110 controls the scanner motor 202 to drive the carriages 9 and 12 through a motor driver 201. In the memory 111, also data necessary for the CPU 110 to carry out various sorts of data processing is stored. The output of the shading correction part 105 is also provided to a connection point mode detecting part 106, which detects modes of histograms (as will be described later) and then provides them to the CPU 110, which then carries out the correction processing therewith.

In a regular original image reading occasion, the scanner γ correction is carried out in addition to the other image data processing mentioned above. When a predetermined operation mode is selected from the operation panel 200 by the operator (user) to carry out scanner γ correction value calculation, the gray scale chart 50 is read, the scanner γ correction values are calculated, and the thus-obtained correction values are stored, automatically by the image processing circuit substrate 100B.

Figure 26:
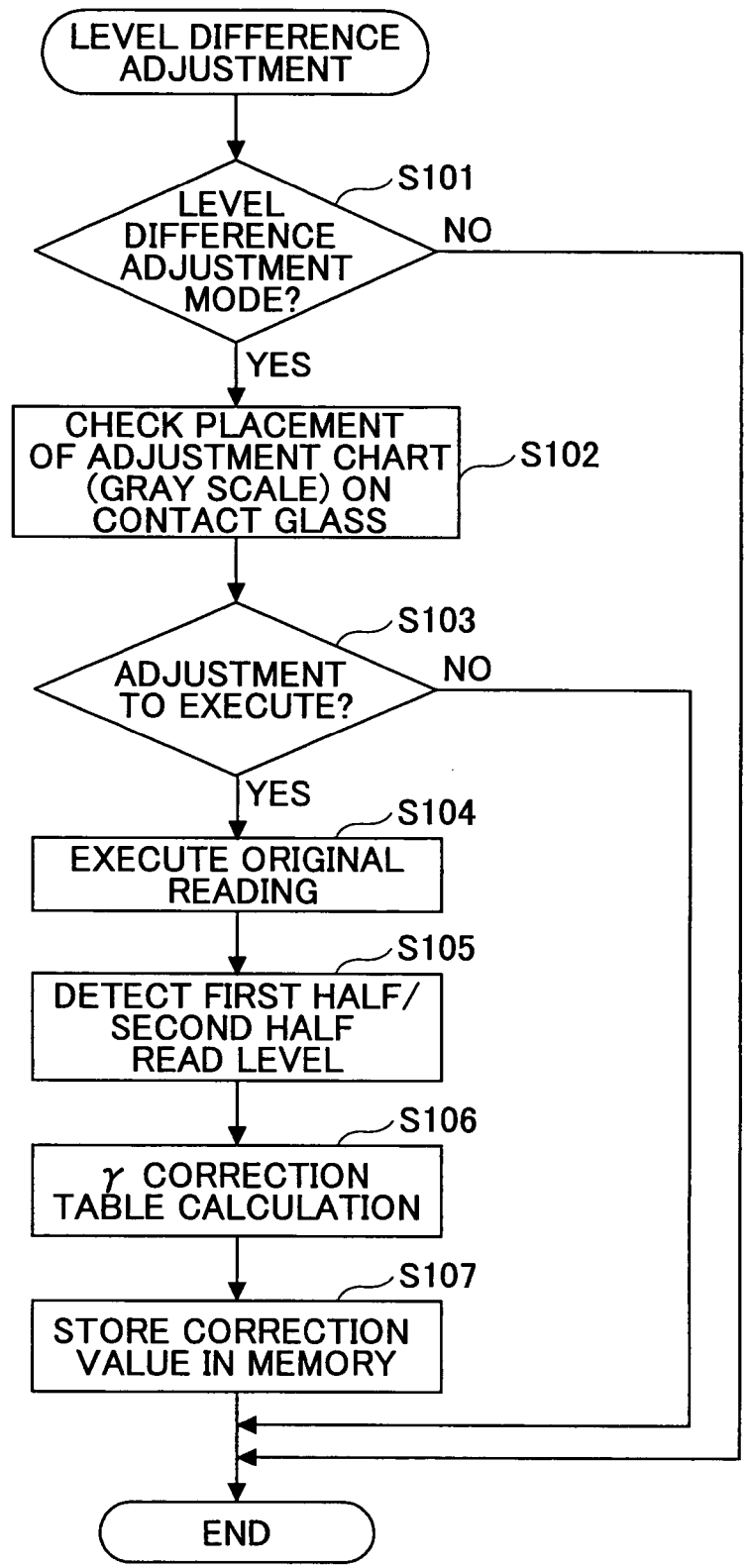
FIG. 26 shows a flow chart of a control procedure for when scanner γ correction values are set in such a manner that the gray scale chart is read first.
Figure 27:
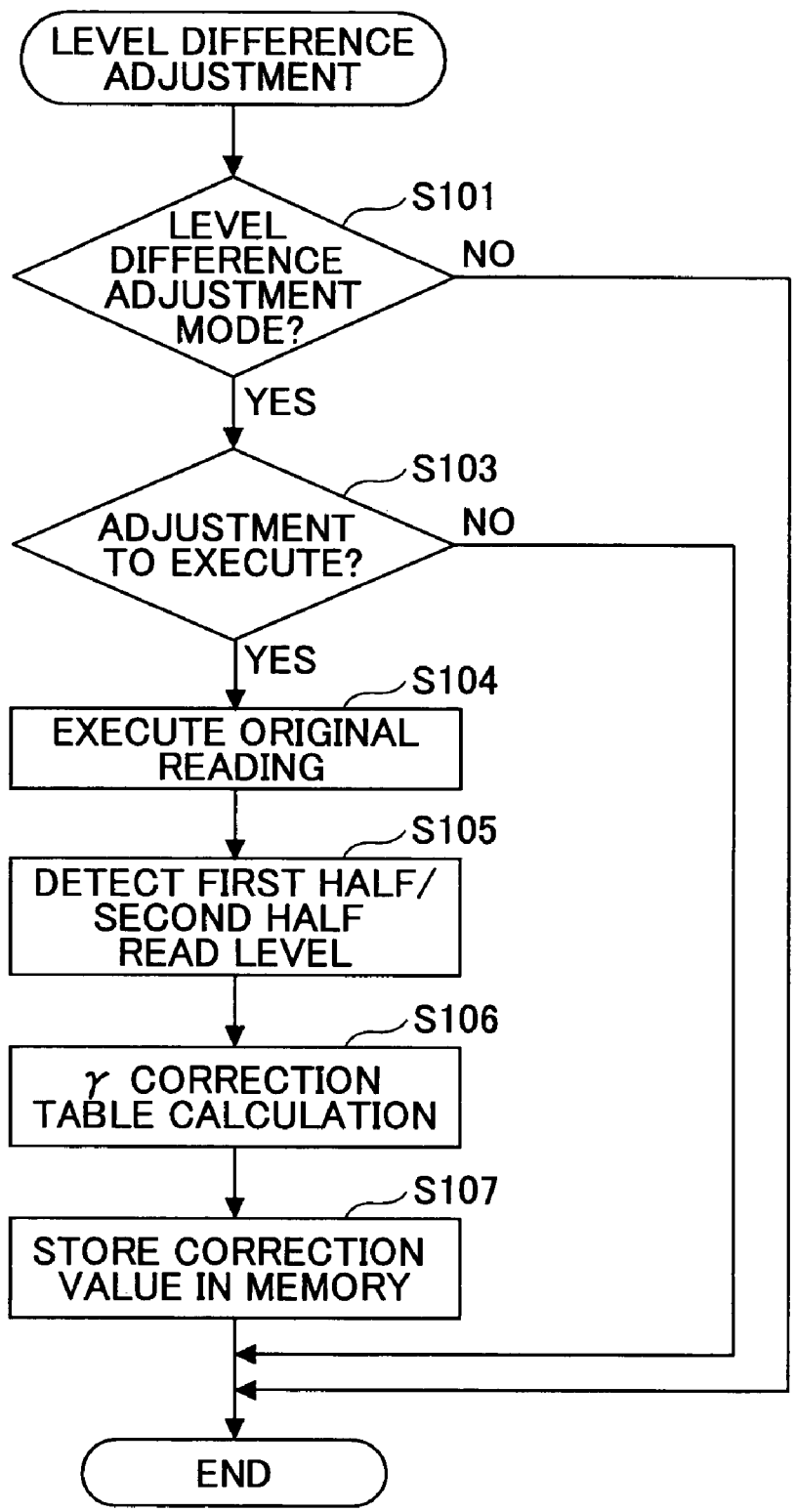
FIG. 27 shows a flow chart of a control procedure for when scanner γ correction values are set in such a manner that the gray scale chart is read first, which gray scale chart is provided in the machine.

FIGS. 26 and 27 show an operation flow chart in an example of a control procedure to calculate the scanner γ correction value to adjust a level difference between the first half and the second half of the CCD 101 (this operation is referred to as scanner γ correction value calculation operation).

Figure 28:
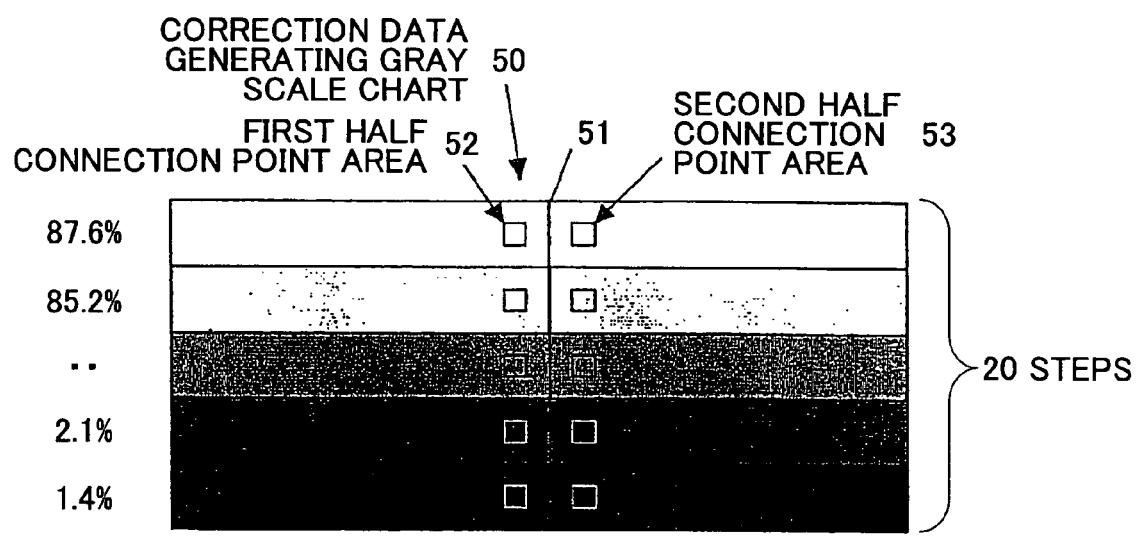
FIG. 28 shows adjustment gray scale chart connection point areas.

In this processing procedure, after the scanner γ correction value calculation mode is selected from the operation panel 200 as mentioned above (Yes in Step S101), a message is displayed on the operation panel 200 to confirm whether or not the adjustment chart (gray scale chart) 50 is already placed on the contact glass 1 (Step S102). FIG. 19 (b) shows a state in which the gray scale chart 50 is placed. FIG. 28 shows one example of the gray scale chart 50 in which 20 steps of tones (brightness levels) are represented from black through white.

After the placement of the adjustment chart (gray scale chart) 50 is confirmed, when an adjustment execution start instruction is given by the operator via the operation panel 200, the image reading apparatus executes scanning operation on the gray scale chart 50 via the contact glass 1 (Yes of Step S103), and the image processing circuit substrate 100B detects image data levels (tones) at a connection point 51 (52, 53) between the first half and the second half of the gray scale chart image by means of the connection point mode detecting part 106 (Step S105), which image data levels are first read by the image reading circuit substrate 100A as a result of the gray scale chart 50 being scanned and read for each of the 20 steps of tones (actually, the number of tones represented by the gray scale chart 20 may be 10 through 20, for example) (Step S103). In the circuit configuration of FIG. 24, 'n' is added to the second half data and thus, it is adjusted to the first half data. Specifically, in an example of FIG. 29 described later, when reflectance is 44%, 20 is added to the second half data 426 and thus, it is adjusted to the first half data 446, for example. As to data following the connection point image data, such correction is carried out on an assumption that the data is linear.

Figure 30:
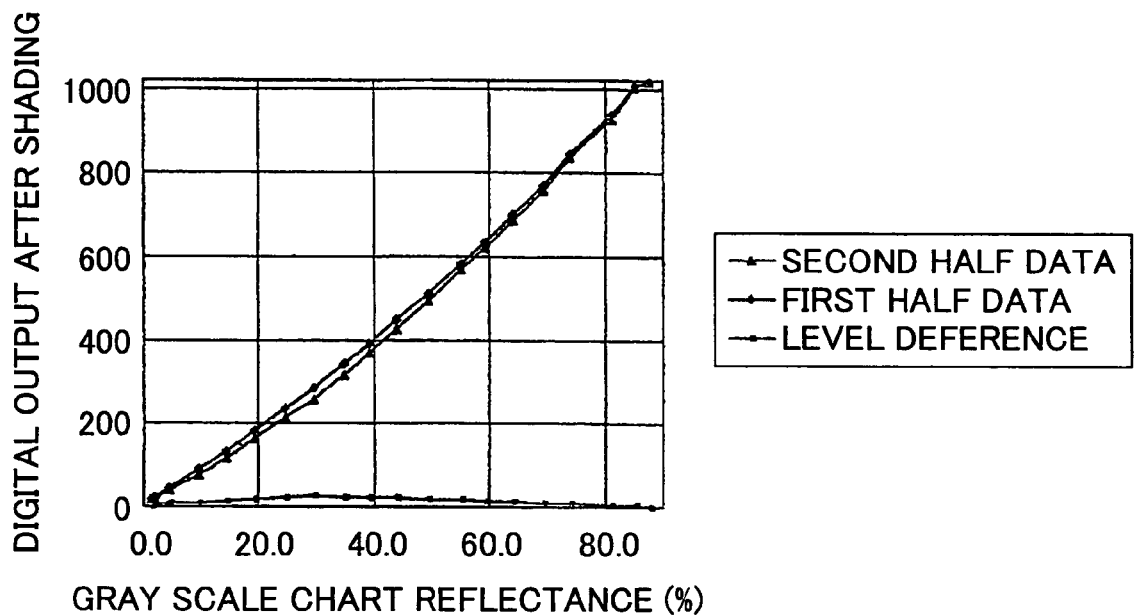
FIG. 30 shows a plot of modes of the connection point between the first halt and second half obtained when th gray scale chart is read.
Figure 31:
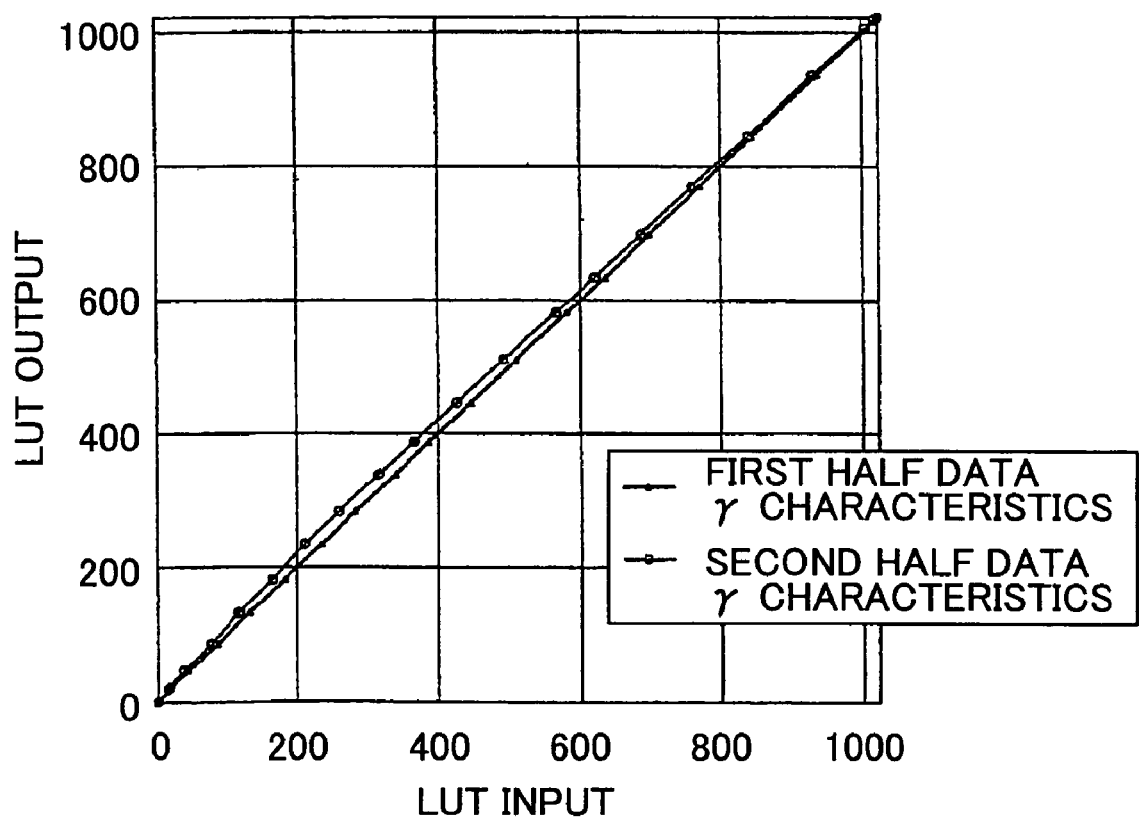
FIG. 31 shows scanner γ correction data contrived from the modes of the connection point between the first half and second half obtained when the gray scale chart is read.

Assuming that the read data of the gray scale chart (for example, total 20 tones) 50 has FD(1), FD(2), ..., FD(19), FD(20) (first half), BD(1), BD(2), ..., BD(19), BD(20) (second half), such a scanner γ condition table (LUT, described later with reference to FIG. 31) is generated (Step S106) that the input data BD(n) is corrected into the output data FD(n), for when the first half is regarded as the standard, and therewith, the scanner γ correction is carried out on the combination data of the even-numbered pixels and odd-numbered pixels of the second half. The calculated scanner γ correction values are stored in the memory 111 (Step S107). FIGS. 29 and 30 show examples of read levels, corresponding to the detected original reflectance. FIG. 31 shows scanner γ characteristics obtained therefrom. FIG. 29 shows relationship between the reflectance and modes (of histograms) of the connection point first half and second half read data. FIG. 30 shows a plot of the data of FIG. 29. FIG. 31 shows a function of the LUT by which input tone values (abscissa) is converted into output tone values (ordinate).

The above-mentioned scanner γ correction, for a later actual original image reading occasion, is carried not by means of the scanner γ correction part 107 (the LUT function part) shown in FIG. 24 or 25. For this purpose, the scanner γ correction data is thus stored in the memory 111. The scanner γ correction part 107 carries out the scanner γ correction on given original image data under the control of the CPU 110, with the use of the scanner γ correction data read from the memory 1111.

At this time, as to output data corresponding to that between adjacent tones, the data is calculated by interpolation of the respective read tone data. Specifically, any method, i.e., linear interpolation between the actually read data, a least square method, or such, may be applied. It is noted that the gray scale chart 50 includes the limited number (for example, 20 steps) of tones as mentioned above. On the other hand, in an actual original image data reading occasion, the actually read image data includes various tones which commonly include those not included those represented by the gray scale chart. In order to also correct these tones of the actually read original image data, interpolation operation is required as mentioned above to obtain the scanner γ correction data therefor.

Further, when the gray scale chart 50 is originally assembled in the image reading apparatus, the step of placement of the gray scale chart can be omitted from the above-described operation flow chart. Further, the light quantity of the lamp may be made variable for the purpose of carrying out the same process as that carried out as if the gray scale chart is read. Further, light quantity charge time may be changed thanks to an electronic shutter function of the CCD for this purpose.

FIG. 29 shows the read data, and, in particular, modes of histograms of data read from the first half and second half connection point areas 52 and 53 of the above-mentioned gray scale chart 50. The mode of the histogram of the data read from a relevant one of the respective tones (20 steps, in the above-mentioned example, and the predetermined tones are represented in a form of row of strips as shown in FIG. 28) of the gray scale chart 50 is regarded as the read data of the relevant step strip area of the gray scale chart 50.

That is, according to the third embodiment, for the connection point image data correction, i.e., the scanner γ correction, is carried out in such a manner that, data (modes) corresponding to the 20 steps of the respective tones of the gray scale chart 50 from which the data has been read is held, while no data is read corresponding to other reflectance. Therefore, based on the 20 modes of the first half and the 20 modes of the second half, which have been already read and obtained as mentioned above, correction data for the other reflectance are calculated by the interpolation operation as described above.

According to the third embodiment of the present invention, by applying the correction method described above, it is possible to avoid necessity of discarding the CCD products, which might be discarded in the prior art as a result of being determined as defective products, for rather being actually used. Accordingly, since they should not be discarded, this is advantageous in an environmental view point.

FIG. 27 shows a control procedure for a case where the gray scale chart is originally incorporated in the apparatus so that Step S102 of checking the placement of the gray scale chart is omitted. All the other steps are the same as those of FIG. 26.

In the third embodiment of the present invention, it is possible to detect and correct the linearity of an analog output of each of the shift registers in the image reading apparatus 100 employing the CCD image sensor having multi-channel shift registers.

Figure 32:
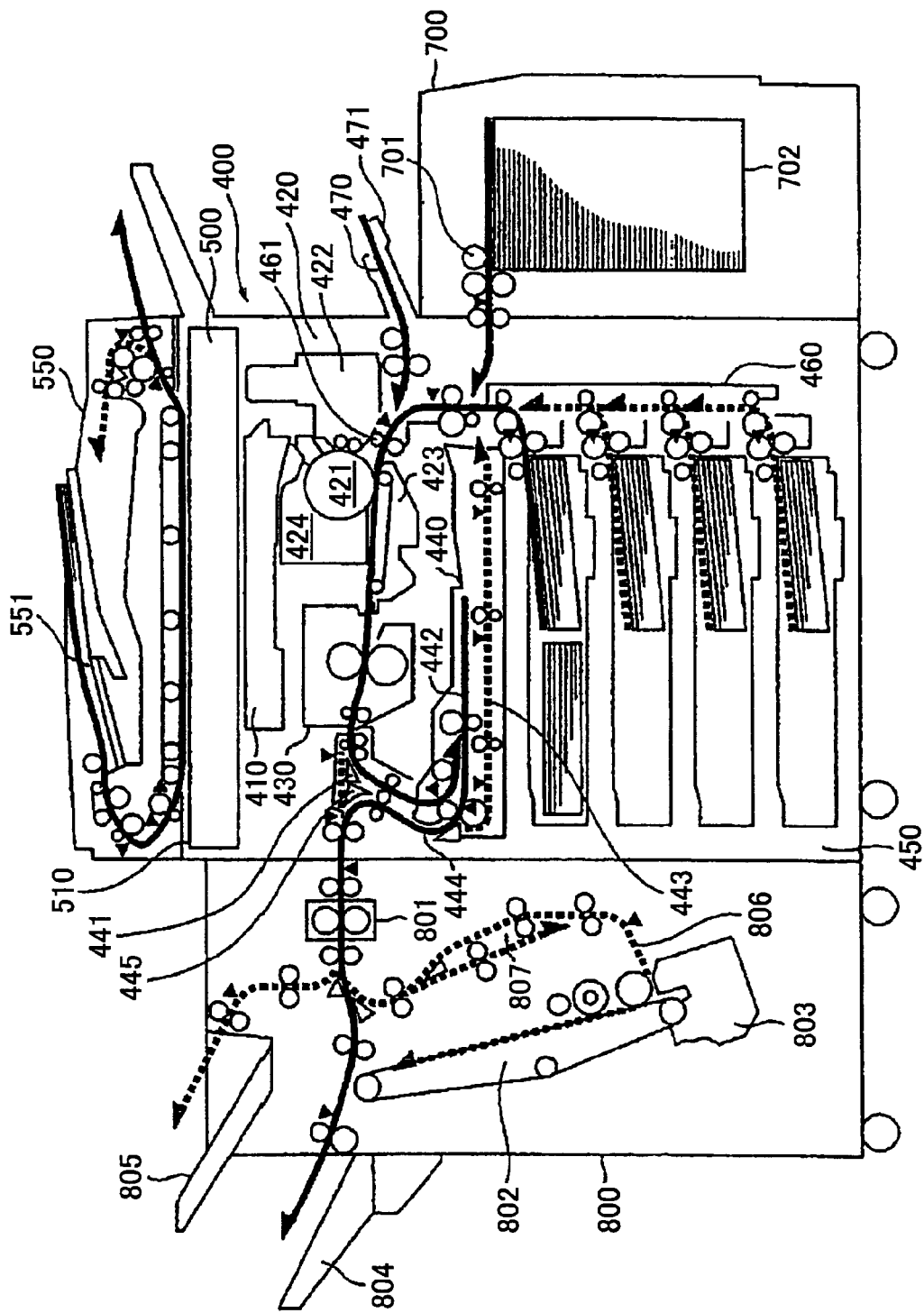
FIG. 32 shows one example of an image forming apparatus employing the image reading apparatus according to the third embodiment.

FIG. 32 shows a general structural view of a digital copier, acting as an image forming apparatus employing an image reading apparatus corresponding to the image forming apparatus shown in FIG. 19 (b) according to the third embodiment of the present invention. In FIG. 32, the digital copier is for monochrome image forming, and generally includes a body 400, the image reading apparatus 500 according to the third embodiment of the present invention, set on th top of th image forming apparatus body 400, an automatic draft feeding apparatus (simply referred to as an ADF, hereinafter) 550 mounted further thereon, a large quantity paper feeding apparatus 700 mounted on the right side of the image forming apparatus body 400 in the figure, and a paper post processing apparatus 800 set on the left side of the image forming apparatus body 400.

The image forming app a body 400 includes an image writing part 410, an image forming part 420, a fixing part 430, a both side conveying part 440, a paper feeding part 450, a vertical conveying part 460, and a manually inserting part 470.

The image writing part 410 modulates an LD which is a light source, based on image information of an oriental read by means of the image reading apparatus 500, and writes the same on a photosensitive drum 410 by laser light with the use of a scanning optical system such as a polygon mirror, an fθ lens, and so forth. The image forming part 420 includes the photosensitive body 421, and a well-known electrophotographic image forming elements such as a developing unit 422, a transfer unit 423, a cleaning unit 424, and an electricity removal unit and so forth, provided along an outer periphery of the photosensitive drum 421.

The fixing unit 430 fixes an image once transferred to the above-mentioned transfer unit 423, into a transfer paper. The both side conveying part 440 is provided on a transfer paper conveyance direction downstream side of the fixing part 420, and has a first switching claw for switching a conveyance direction of the transfer paper between to a side of the paper post processing part 800 or to a side of the both side conveyance part 440; an inverting conveyance path 442 to which the transfer paper is led by means of the first switching claw; an image forming side conveyance path 443 for conveying the transfer paper once inverted by the inverting conveyance path 442 to a side of the transfer unit 423 again; and a post processing side conveyance path 444 for conveying the transfer paper to a side of the paper post processing apparatus 800. A second switching claw 445 is provided at a branching part for the image forming side conveyance path 443 and the post processing side conveyance path 444.

The paper feeding part 450 includes four paper feeding stages, from which transfer paper is selected and drawn out by means of a pickup roller and a paper feeding roller from those held by the respective paper feeding stages, and the thus picked up transfer paper is led to the vertical conveyance part 460. In the vertical conveyance part 460, the thus-picked up transfer paper is conveyed to a registration roller pair 461 immediately before a paper conveyance direction upstream side of the transfer unit 423. The registration roller pair 461 provides the transfer paper to the transfer unit 423 in timing with the top end of a developed image on the photosensitive drum 421. The manually inserting part 470 is provided with a manually inserting tray 417, which can be opened/closed, for providing transfer paper to the transfer unit as is necessary. Also in this case, the registration roller pair 461 conveys the transfer paper in an appropriate timing.

The large quantity paper feeding apparatus 700 stacks a large quantity of transfer paper in one size, and provides the same. There, as the transfer paper is consumed, a bottom plate 702 is lifted, and thus, picking up of the paper can be airways ensured by means of a pickup roller 701. The transfer paper fed by the pickup roller 701 is conveyed to the nip of the registration roller pair 461 through the vertical conveyance part 460.

The paper post processing apparatus 800 carries out predetermined processing such as punching, alignment, stapling, sorting or such. In this embodiment, for this purpose, a punch 801, a staple (alignment) tray 802, a stapler 803 and a shift tray 804 are provided. That is, the transfer paper conveyed from the image forming apparatus 400 undergoes punching sheet by sheet if necessary by means of the punch 801, and after that, is ejected to a proof tray 805; or, is ejected to a shift tray 804 if sorting and stacking is carried out. The sorting is carried out as a result of the shift tray 804 moving reciprocally for a predetermined amount in a direction perpendicular to the paper conveyance direction. Other than this, the paper conveyance path may be used for this purpose and a part of the path may be moved in a direction perpendicular to the paper conveyance direction.

When the alignment is carried out, the transfer paper is led to a bottom conveyance path 806, an end thereof along the direction perpendicular to the paper conveyance direction is aligned by means of a rear end fence, and an end thereof parallel to the paper conveyance direction is aligned by means of a jogger fence. When the stapling is carried out, a predetermined position, for example, a corner, or central two positions of an edge of the thus aligned transfer paper sheaf is stapled, and after that, a discharging belt is used to eject the thus-processed transfer paper to the shift tray 804. Further, a pre-stack conveyance path 807 is provided in the bottom conveyance path 806, whereby a plurality of sheets of the paper on conveyance are stacked, and thus, interruption of the image forming operation in the image forming apparatus 400 can be avoided.

In the image reading apparatus 500, corresponding to the above-described image reading apparatus in the third embodiment of the present invention with reference to FIG. 19 (b), an original placed on a contact glass 510 fed by the ADF 600 is optically scanned, and, a read image, which is formed by means of first through third mirrors and an imaging lens, is read in by means of a photoelectric converting device such as CCD or a CMOS. The thus-read image data is then processed by an image processing circuit such as the image reading circuit substrate 100A and the image processing circuit substrate 100B, described above with reference to FIGS. 24 and 25, and then is once stored in a storage device. Then, when image forming is carried out therefrom, the image writing part 410 reads the stored image data, modulates the laser, and carried out optical writing as described above.

The ADF 550 has a both side reading function, and is provided on a surface of the contact glass 510 of the image reading apparatus 500 in such a manner that is can be opened/closed. In the ADF 550, an original placed on an original placement table 551 is automatically conveyed into on the contact glass 510 when the original is read.

The above-mentioned image reading apparatus according to the third embodiment of the present invention may be employed by, not only the digital copier as described above, but also, in a digital multi-function machine, a facsimile machine, a scanner, and so forth.

Thus, according to the third embodiment of the present invention, 1) linearity correction (scanner γ correction) values for the first half of the second half are calculated with the use of the modes of the histograms for each output direction of the first half and the second half, obtained from the histograms of the connection point between the first half and the scone half of combination data obtained for the respective ones of the output directions of the first half and the second half. Accordingly, it is possible to avoid image tone difference otherwise occurring at the connection point, and to avoid production of a defective image, without much increase of the costs.

2) Scanner γ correction is carried out on data which is a combination of even-numbered pixels and odd-numbered pixels of the first half and the second half of outputs of the shift registers, which shift registers are used for transferring electric charges stored in the photodiodes and are divided into the first half and the second half with respect to the center. As a result, effective correction of the read levels of the connection point between the first half and the second half can be achieved with the minimum correction means.

3) The correction values are calculated from data read from th gray scale chart which may be placed on an original reading part of the image reading apparatus. In this case, it is not necessary to assemble the gray scale chart in the image reading apparatus, and thus, the costs can be reduced accordingly.

4) The correction values are calculated from data read from the gray scale chart which may be assembled in the image reading apparatus. In this case, the user should not specially prepare the gray scale chart, and the correction value calculation can be positively carried out with the use of that assembled in the machine.

5) By applying interpolation calculation, it is possible to obtain correction data for required tones, from the data read from the gray scale chart having the limited tones represented there.

6) By applying the LUT (lookup table), it is possible to easily carry out γ conversion (scanner γ correction).

7) It is possible to minimize the size of LUT used for the scanner γ correction as mentioned above, and thus, the costs can be reduced thanks to reducing the required memory capacity, and also, required time for reading data from the memory can be reduced.

8) It is possible to avoid necessity of discarding of CCD products, which might be discarded in the prior art as a result of being determined as defective products, for rather being actually used. Accordingly, since they should not be discarded, this is advantageous in an environmental view point.

9) Since the user interface (operation panel 200) is applied to give instructions to actually carry out the correction value calculation, the operator can easily carry out the correction value calculation.

Fourth Embodiment

A general configuration of an image reading apparatus in a fourth embodiment of the present invention is the same as that in the related art described above with reference to FIG. 19 (*a*), and also, the same as that of the third embodiment which has been discussed above in the description of the third embodiment.

Figure 33:
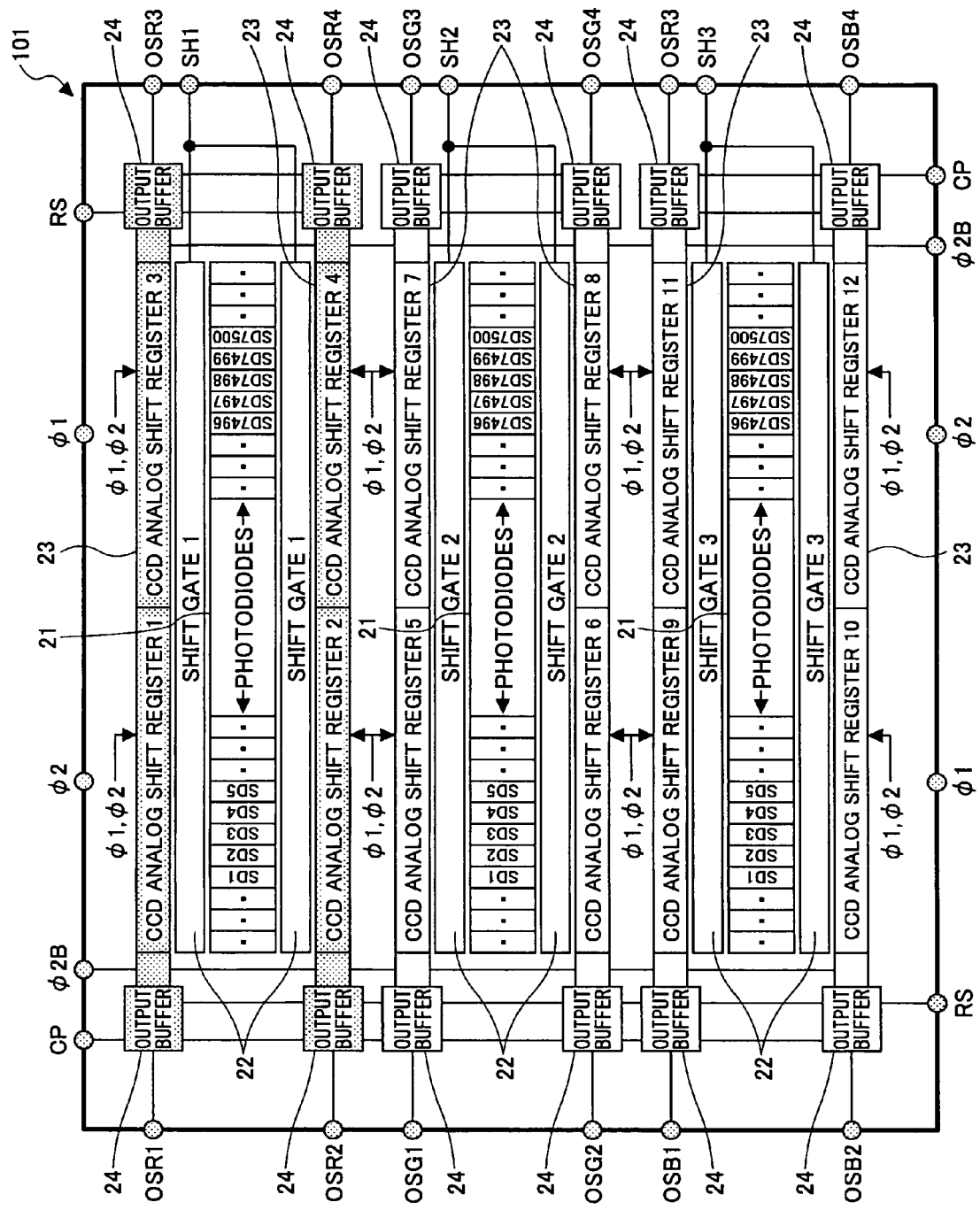
FIG. 33 shows a configuration of CCD shift registers in a type of four series in a fourth embodiment in which two series outputs are made from each of first half and second half shift registers in the image reading apparatus.

FIG. 33 shows a three-line sensor having analog shift registers of four series (i.e., the first half two series: even-numbered pixels and odd-numbered pixels and the second half two series: even-numbered pixels and odd-numbered pixels) each color for a CCD image sensor of an image reading circuit substrate 14, for the purpose of increasing the reading speed. In FIG. 33, OS*1 through OS*4 denote respective output terminals, and '*' denotes any one of three colors (R (red), G (green), B (blue)) of the color sensors. Further, OS*1 and OS*2 denote the first half odd-numbered pixel and even-numbered pixel outputs, respectively. OS*3 and OS*4 denote the second half odd-numbered pixel and even-numbered pixel outputs, respectively.

In the above-mentioned configuration, the same as the third embodiment, any one of the flat bed system and the sheet through system may be selected, for actually reading an original image.

Figure 34:
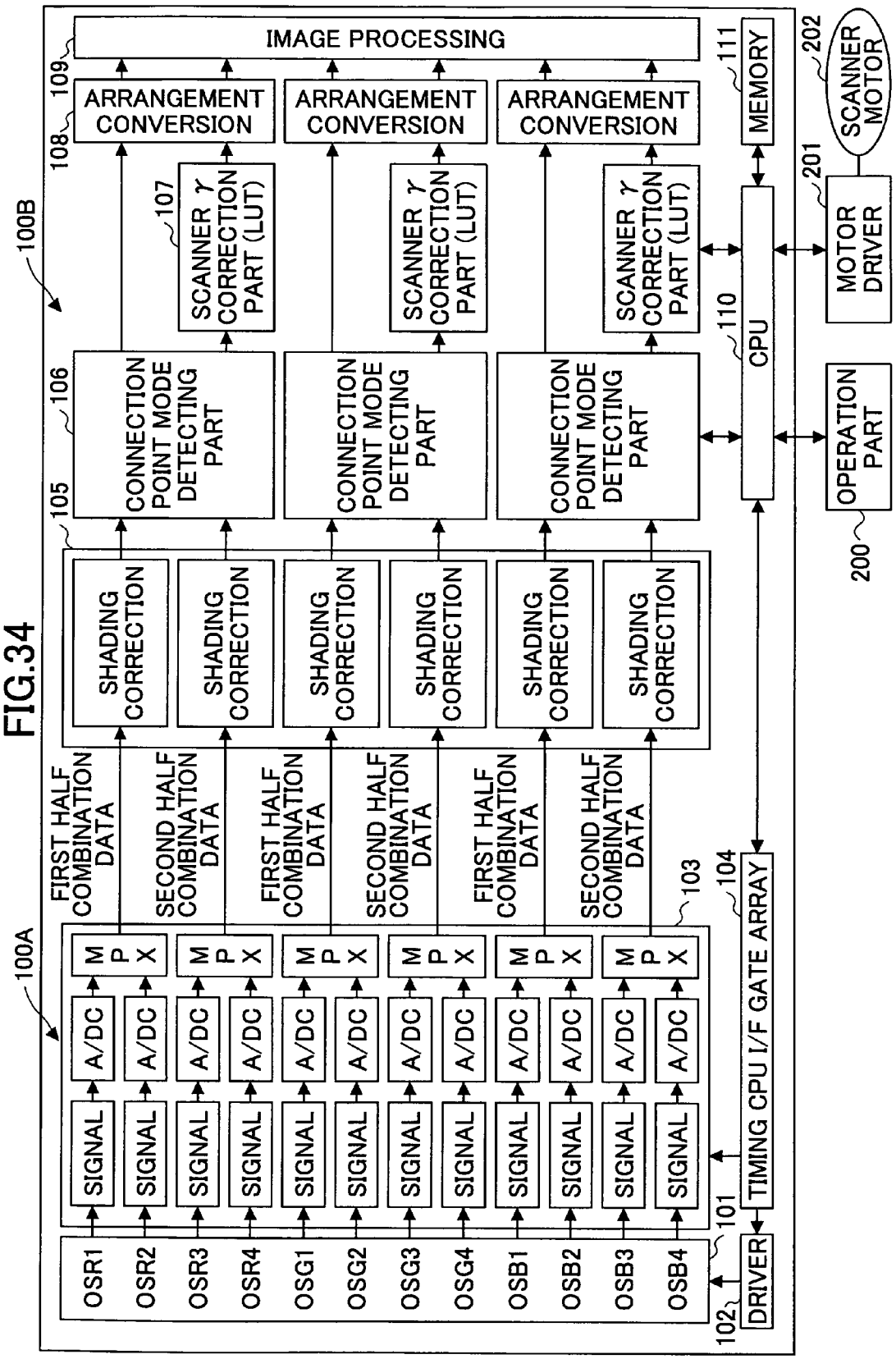
FIG. 34 shows a block diagram showing a configuration of an image reading circuit substrate and an image processing circuit substrate in the fourth embodiment of the present invention.
Figure 35:
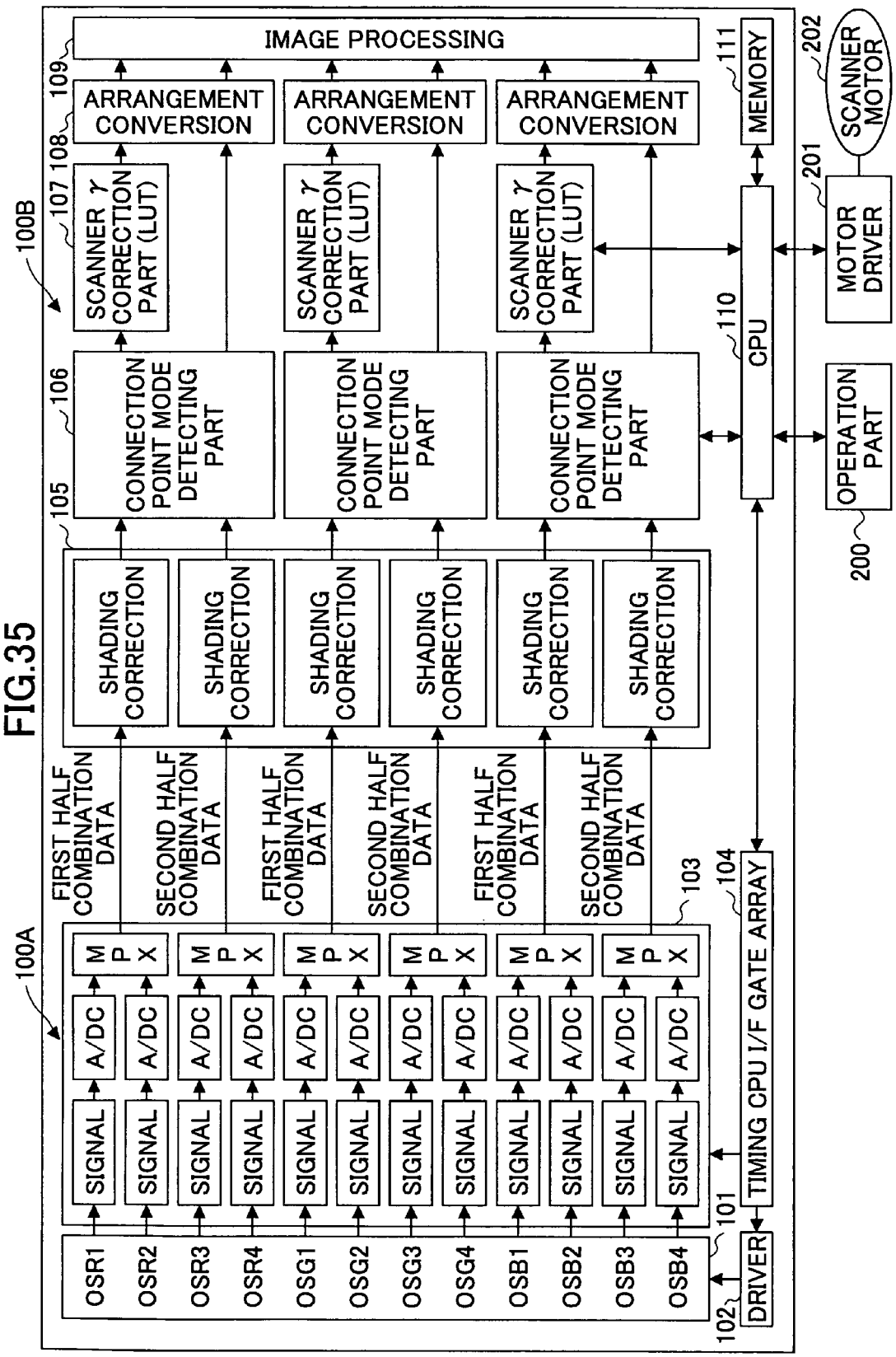
FIG. 35 shows another example of a block diagram showing a configuration of an image reading circuit substrate and an image processing circuit substrate in the fourth embodiment of the present invention in which the channels to carry out scanner γ correction are different from those of FIG. 34.

FIGS. 34 and 35 show the image reading apparatus according to the fourth embodiment of the present invention. FIG. 34 shows a case where the channels to carry out the scanner γ coercion are the second half while FIG. 35 shows a case where the channels to carry out the scanner γ correction are the first half. In these figures, reflected light from an original undergoes photoelectric conversion by the CCD 101 driven by a CCD driving driver 102. As mentioned above, the CCD 101 has the three-line sensors having the analog shift registers of four series (i.e., the first half two series: even-numbered pixels and odd-numbered pixels and the second half two series: even-numbered pixels and odd-numbered pixels) each color. The analog output signals therefrom undergo black offset adjustment, gain adjustment and so forth in a signal processing part 103, and are converted into digital signals in A-D converters A/DC. Multiplexers MPX generate combination data which is a combination of the read data of the first half even-numbered pixels and odd-numbered pixels and combination data which is a combination of the read data of the second half even-numbered pixels and odd-numbered pixels. A gate array 104 generates driving timing for the CCD 101 and the A-D converters A/DC, and so forth.

The combination data thus combined for each of the first half and the second half for each of the colors, i.e., R, G and B, undergoes shading correction in a shading correction circuit 105. The specific manner of this correction is the same as the well-known art. The data thus having undergone the shading correction is then input to a connection point mode detecting part 106. When linearity correction data (i.e., scanner γ correction data) described later is to be generated, the first half/second half connection point data is made to undergo statistical processing, and thus, histogram mode data is obtained in the connection point mode detecting part 106. When the linearity correction data is not to be generated, i.e., when regular original reading operation is carried out, the connection point mode detecting part 106 is skipped over.

In the case of FIG. 34, the second half combination data is input to scanner γ correction parts 107, while the first half combination data is input to the scanner γ correction parts 107 in the case of FIG. 35. There, the read image data level different between the first half and the second half is corrected. Thus, any one of the first half and the second half undergoes the scanner γ correction, the correction is thus carried out on the even-numbered pixel and odd-numbered pixel combined data of the first half or the second half, and thus, the effective correction can be archived even with the minimum necessary correction means (scanner γ correction parts 106 (LUT)).

After the scanner γ correction is thus carried out, an arrangement converting parts 108 carry out processing such that the data, separate into the first half (even-numbered pixel and odd-numbered pixel combined data) and the second half (even-numbered pixel and odd-numbered pixel combined data), is then converted into a data format of the even-numbered pixels and the odd-numbered pixels. Then, well-known various sorts of image processing is carried out in an image processing part 109.

An operation panel 200 is provided for an operator to input various sorts of operation in the image reading apparatus, and therewith, the operator can make setting and so forth for carrying out image reading. A CPU 110 carries out sequence control of the entirety of the image reading apparatus, and, thereby, when the operator selects a mode of calculating the scanner γ correction values from the operation panel 200, the gray scale chart is automatically read, and therewith, the scanner γ correction values are calculated and are stored.

Unless otherwise particularly described, the respective parts of the fourth embodiment are configured as the same as those of the third embodiment, and function in the same manner.

Operation of the fourth embodiment will now be described with reference to FIGS. 36 through 38.

Figure 36:
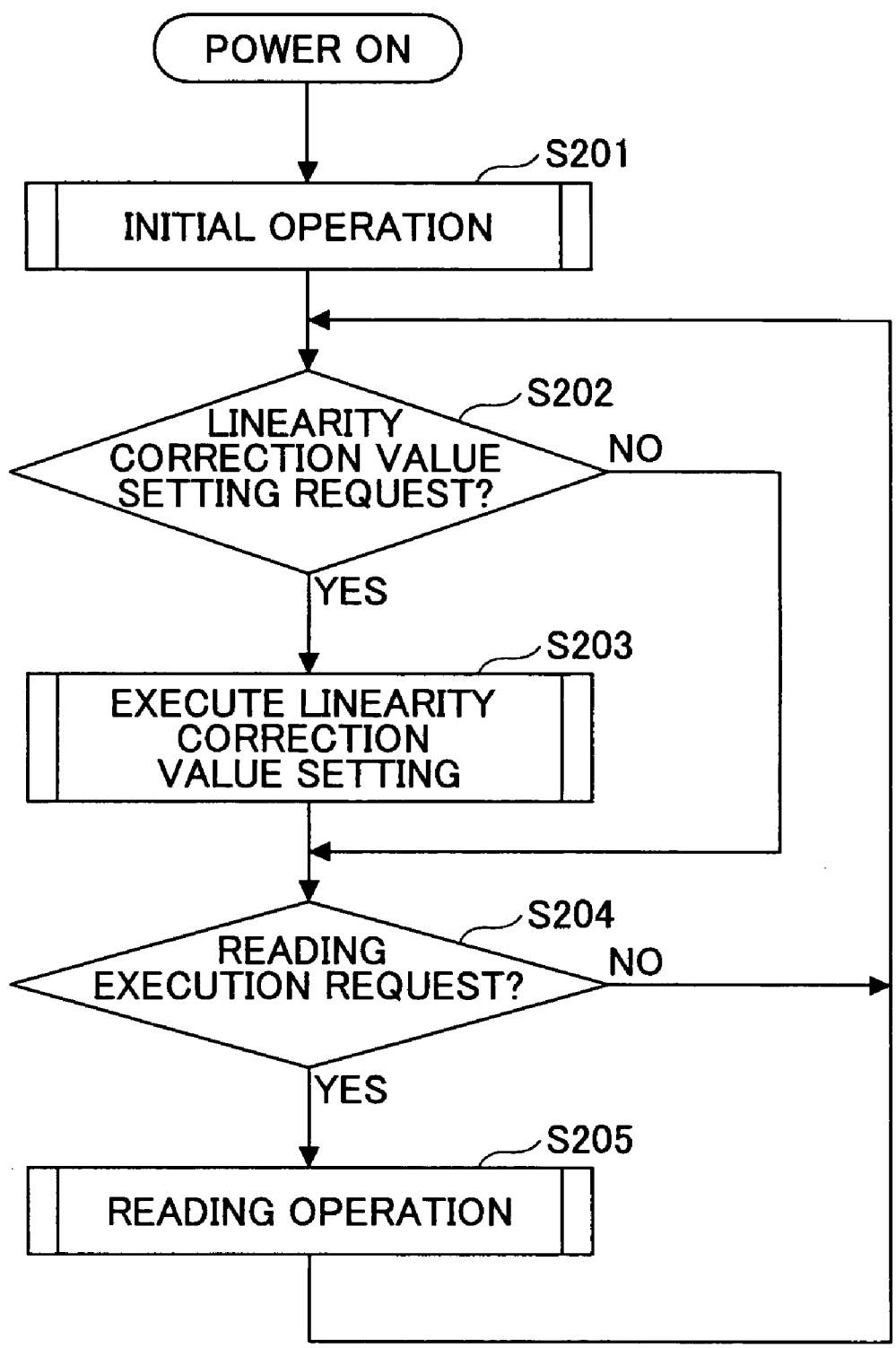
FIG. 36 shows a flow chart of an entire control procedure of the image reading apparatus according to the fourth embodiment of the present invention.

FIG. 36 shows a general control procedure of the image reading apparatus in the fourth embodiment.

In FIG. 36, when the power supply is turned on in the image reading apparatus, first initial operation is carried out (Step S201). Specifically, processing of the black offset adjustment, gain adjustment and so forth, and setting of a gray balance condition and so forth, is carried out in the signal processing part 103. Next, it is determined whether or not a linearity correction value (scanner γ correction value) setting request is made from the operation panel 200 (Step S202). When the setting request is made, the linearity correction values are obtained (Step S203). In prior thereto, the gray balance adjustment condition setting operation is carried out with the use of the data (first half or second half) which is other than the data to undergo the scanner γ correction. After that, the scanner γ correction data, which is to be reflected in the scanner γ correction parts 106, is obtained.

Then, it is determined where or not a reading request is made from the operation panel 200 (Step S204). When the reading request is made, reading operation is carried out (Step S205).

Figure 37:
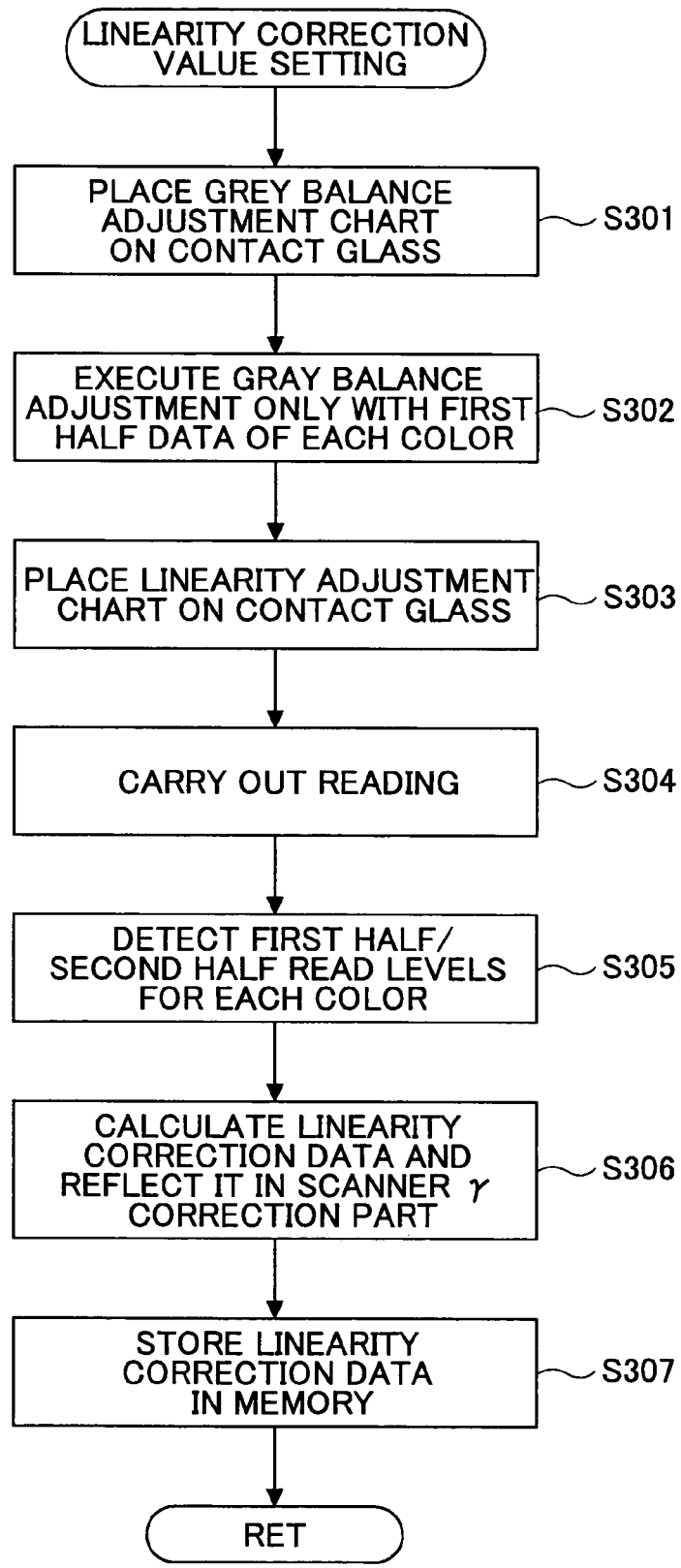
FIG. 37 shows a flow chart of a control procedure for linearity correction value setting in the image reading apparatus according to the fourth embodiment of the present invention.

FIG. 37 shows a flow chart which shows a control procedure of a subroutine of the linearity correction value setting (i.e., the scanner γ correction value setting) of Step S203.

In FIG. 37, it is noted that the 'gray balance adjustment condition setting' means setting of a condition for gray balance adjustment for the purpose of color adjustment in this color image reading apparatus, and, commonly, an achromatic color (gray) original (i.e., a gray balance adjustment chart) is used, and the gray balance adjustment condition is thus set such that gray balance adjustment is made such that RGB output values become to have optimum values. First the gray balance adjustment chart is placed on the contact glass (Step S301). The 'optimum values' are determined according to the particular design specification of the image reading apparatus. Then, the gray balance adjustment condition setting is actually carried out (Step S302). In the example of FIG. 34, the gray balance adjustment condition setting is carried out with the use of the first half RGB data on the side which is other than one to undergo scanner γ correction. In this case, the second half RGB data output from the shading correction parts 105 is processed according to the gray balance condition which has been thus set with the use of the first half RGB data in the above-mentioned gray balance adjustment condition setting operation. On the other hand, in the example of FIG. 35, the gray balance adjustment condition setting operation is carried out with the use of the second half RGB data on the side which is other than one to undergo scanner γ correction. Specific contents of this adjustment are determined according to the particular configuration of the image reading apparatus. That is, the adjustment is achieved by controlling the reference voltage of the A-D converters, changing coefficients applied for the shading calculation, or so.

After Step S302 is finished, a linearity correction chart (i.e., a scanner γ correction chart) is placed on the contact glass 1 (Step S303). The purpose of the linearity correction (scanner γ correction data) is to eliminate the data difference between the first half and the second half at the connection point therebetween. For this purpose, a gray scale chart (i.e., the linearity correction chart) having the number of tone steps, as large as possible for obtaining correction data applicable to any actual output values, may preferably be applied. After that, this linearity correction chart is read by the configuration shown in FIG. 19 (Step S304), and the CPU 110 takes read values of the first half and second half for each color by means of the connection point mode detecting parts 106.

In Step S306, in the example of FIG. 34, for each color, correction data is obtained such that, therewith, the second half read values of the gray scale chart may become coincident with the first half read values of the gray scale chart. Interpolation calculation is applied to obtain data for actual original read value other than those represented by the gray scale chart. The thus-obtained correction data is reflected in the scanner γ correction parts 107. In the example of FIG. 35, for each color, correction data is obtained such that, therewith, the first half read values of the gray scale chart may become coincident with the second half read values of the gray scale chart. In a memory 111, the gray scale chart read data is stored in Step S307 for being used in actual scanner γ correction carried out on read image data in a regular actual original reading operation. It is noted that, in the actual scanner γ correction in a regular actual original reading operation, the scanner γ correction data thus stored is used in a form of the LUT, wherewith given read original data is converted into corrected data, as mentioned above for the other embodiment. Instead, when the memory 111 may have a larger storage capacity, also the results of the interpolation calculation may be stored there.

Figure 38:
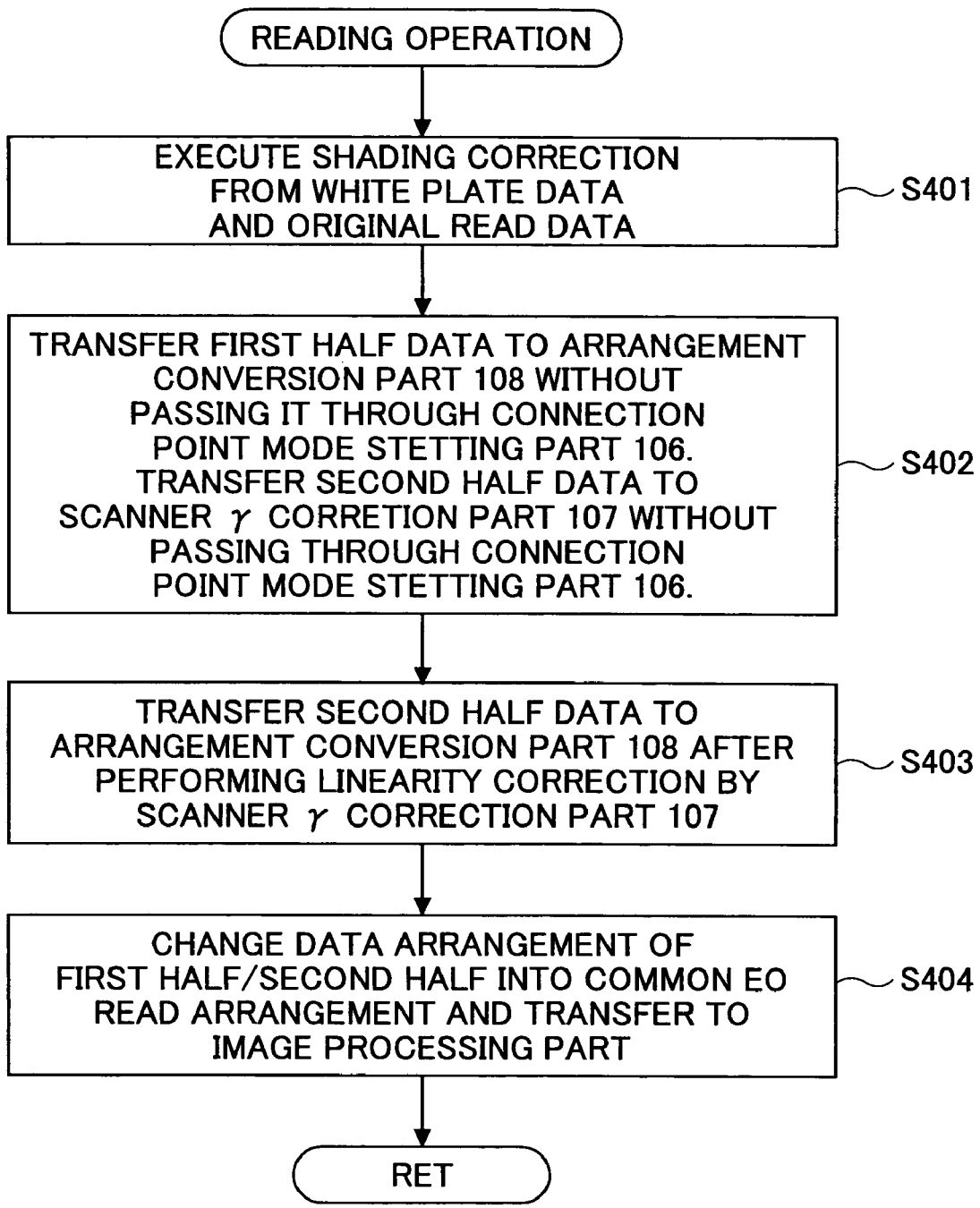
FIG. 38 shows a flow chart of a control procedure of reading operation in the image reading apparatus according to the fourth embodiment of the present invention.

FIG. 38 shows a flow chart for a data flow of the actual original reading operation.

In this processing, in Step S401, first half and second half data each color after undergoing the shading correction is output from the shading correction parts 105 base on white plate read data or original read data. In Step S402, in the example of FIG. 34, for each of the first half and second half data, the connection point mode detecting parts 106 are skipped over. Then the first half data is input to the arrangement converting parts 108, while the second half data is once input to the scanner γ correction parts 107. FIG. 38 corresponds to this example of FIG. 34.

In the example of FIG. 35, the same as the above, for each of the first half and second half data, the connection point mode detecting parts 106 are skipped over. However, contrary to the example of FIG. 34, the second half data is input to the arrangement converting parts 108, while the first half data is once input to the scanner γ correction parts 107 in the example of FIG. 35.

In the example of FIG. 34, the second half data undergoes the linearity correction in the scanner γ correction parts 107, thus it is converted so that difference between the first half and the second half at the connection point therebetween is eliminated, and then, is input to the arrangement converting part 108 (Step S403). Then, the image data thus processed so that the first half and second half connection point difference is eliminated is converted into the data arrangement corresponding to that which should obtained in a common case where a one direction reading CCD is applied, and is input to the image processing part 109.

According to the fourth embodiment, in the image reading apparatus employing the CCD sensor having the multi-channel shift registers, analog output linearity correction can be carried out for each shift register and a dynamic range can be determined.

Unless otherwise particularly described, each part and each function of the fourth embodiment are the same as those of the third embodiment.

Thus, according to the fourth embodiment, 1) RGB gray balance adjustment is carried out with the use of the EO combined first half data for example, and after that, scanner γ correction is carried out on the EO combined second half data in this example, so that the first half and second half connection point difference is eliminated. Thus, it is possible to read an original image at a high speed, and also, a smooth image in which the first half and second half connection point difference is well eliminated can be obtained.

2) Further, a condition for the gray balance adjustment for the other of the first half and the second half is made coincident with that obtained when the one thereof has been applied for the gray balance adjustment condition setting operation. As a result, a fine image in which color distortion does not exist can be obtained, even when a color image is read.

3) Even when the gray scale chart having the limited number of tone steps represented is applied, required tone correction values can be obtained through interpolation calculation.

Now, with reference to FIGS. 39 through 41, the level adjustment (scanner γ correction) control procedure with the use of histograms according to the third embodiment described above with reference to FIG. 26, will be described in detail.

By means of the level adjustment with the use of the histograms, as mentioned above, it is possible to avoid discarding of CCD products, which would be discarded in the prior art as a result of being determined as defective products, so that they can be actually used. Accordingly, since they should not be discarded, this is advantageous in an environmental view point.

Furthermore, even when tone values of the respective tones of the gray scale chart 50 shift due to a certain noise factor such as adherence of a stain on the gray scale chart 50 or so, the correction values in the scanner γ table can be set in a condition in which the influence thereof can be eliminated to the utmost.

Figure 39:
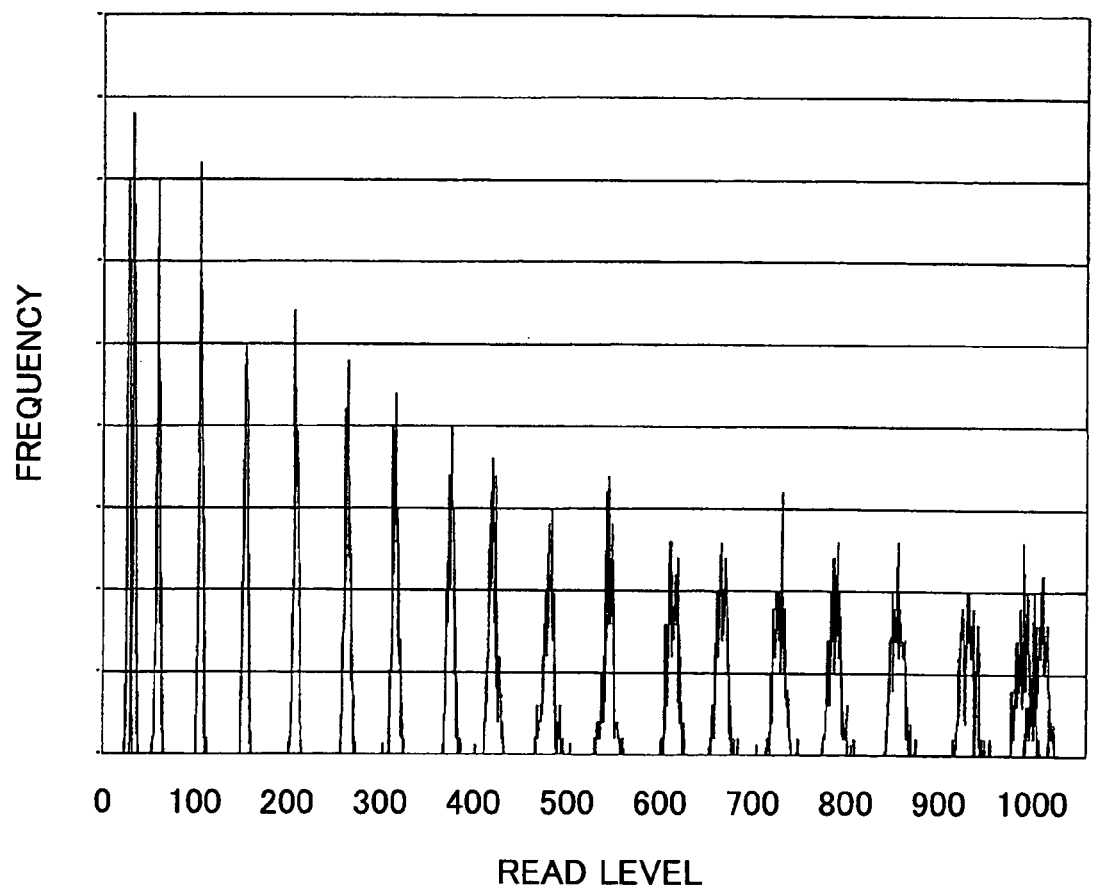
FIG. 39 shows one example of a histogram obtained when a gray scale chart is read.

FIG. 39 shows an example of a histogram of tone detection values obtained when the 20 tone gray scale chart 50 is read by the CCD image sensor 101.

As shown, the histogram has peaks of tone levels corresponding to the respective ones of the tones represented by the gray scale chart 50 shown in FIG. 28.

Figure 40:
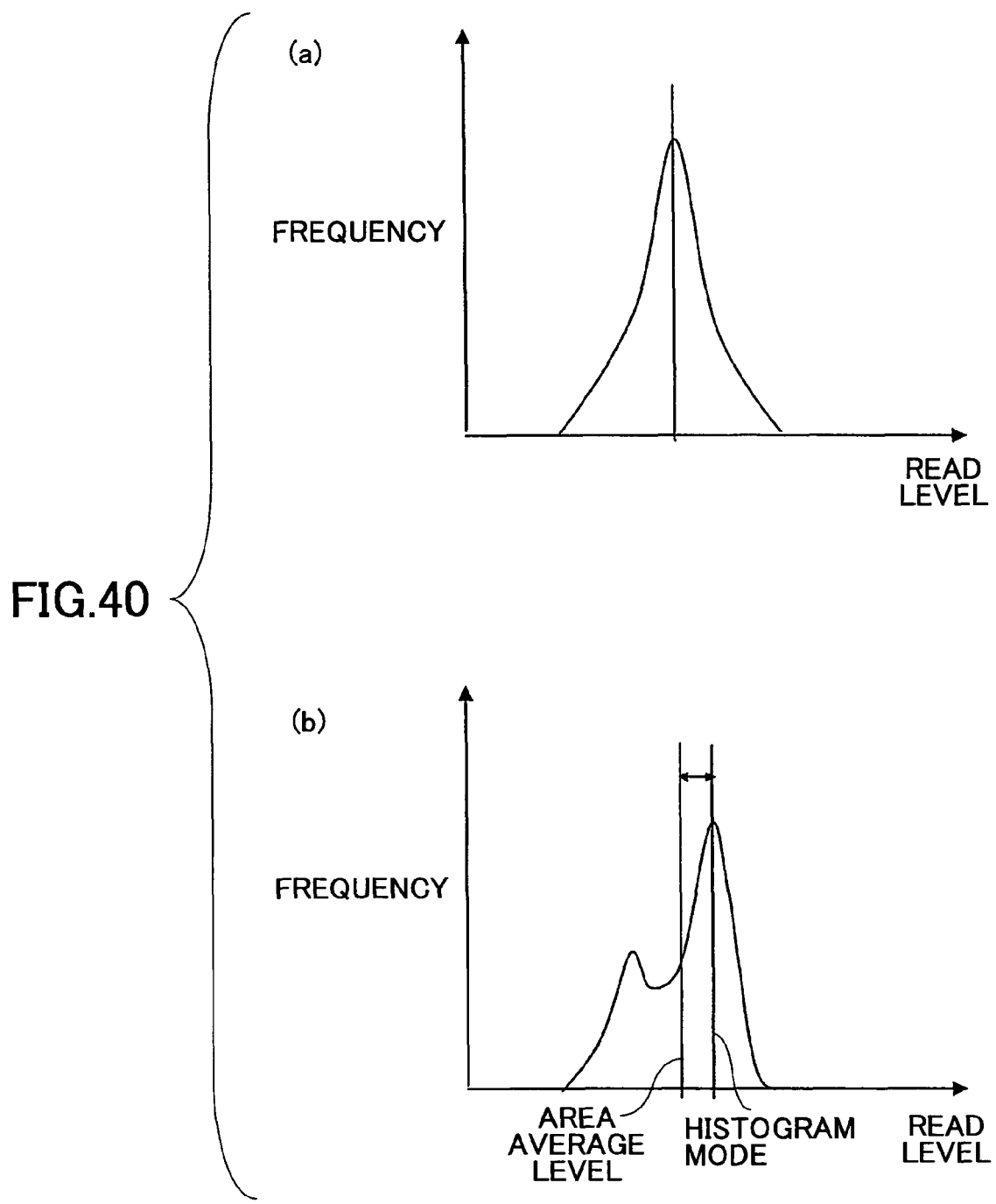
FIG. 40 illustrates an influence of a noise factor such as a stain on the gray scale chart in the histogram shown in FIG. 39.

FIG. 40 (a) typically shows a histogram only for one of the strip areas of the respective tone steps of the gray scale chart 50, of the histogram shown in FIG. 39.

When there is almost no special influence of a stain or such on the gray scale chart 50, the average value of the tone detection values approximately coincides with the mode level of the histogram, as shown in FIG. 40 (a).

On the other hand, when a noise influence caused by a stain or such exists on the gray scale chart 50, from the average value of the tone detection values, the mode level of the histogram deviates, as shown in FIG. 40 (b).

In such a case, rather the mode of the histogram can be said to be nearer to the true value of the actual read level of the detected strip area of the gray scale chart 50. That is, in many cases, a noise factor due to a stain or such on the gray scale chart 50 may be of deference in tone level due to a stain or such put particularly at a corresponding part of the detected strip area. In such a case, the tone detected value average of the entirety of the detected strip area shifts due to the corresponding shift in the reflectance of the stain put part. However, in this case, the other area of the detected strip area than the stain put part, the original tone values are left unchanged. This is the reason why the mode of the detected levels can be said nearer to the true value.

Accordingly, instead of simply applying the area average value of the tone detected values to carry out the level correction between the first half and the second half, more appropriate correction can be achieved when the level correction between the first half and the second half is carried out with the use of the mode of the histogram of the tone detected values. Accordingly, it is preferable that, when the level correction values are obtained from read values of the gray scale chart, the histogram such as that shown in FIG. 39 is provided from the read values of the gray scale chart 50, and the mode of the detection levels of each of the detection strip areas is used as the read value of the corresponding tone to be actually applied to the correction.

FIG. 41 shows a control procedure for the case.

In this processing, as described with reference to FIG. 26, when the level difference adjustment (scanner γ correction data setting) mode is selected from the operation panel 200 shown in FIG. 24 or 25, a message is displayed on the operation panel 200 to confirm whether or not the adjustment chart (gray scale chart) 50 is already placed on the contact glass 1 (Step S501, S502). After the placement of the adjustment chart (gray scale chart) 50 is confirmed by the operator, then, when an adjustment execution start instruction is given by the operator via the operation panel 200 (Step S503), the image reading apparatus executes scanning operation (Yes of Step S504), and the image processing circuit substrate 100B detects image data levels of the gray scale chart 50 read by means of the image reading circuit substrate 100A, and produces the histograms such as that shown in FIG. 39 (Step S505).

Specifically, in a case of the gray scale chart of 20 tones, histograms of the respective 20 tone strip areas are generated from data of each of the above-mentioned first half and the second half tone detected data. From the histograms, the mode is calculated for the corresponding tone detected level for each tone level (Step S507), and is stored in the memory 111 (Step S508). In this case, the tone (reflectance) detected data is obtained for 20 tones for each of the first half and the second half, each of the color components, i.e., R, G, B and K (red, green, blue and black) (4). As a result, total 160 (20×2× 4=160) words of tone detected values are obtained and stored.

With the use of the thus-stored the detected values, by means of the processing of Steps S106 and S107 of FIG. 27 (corresponding to Steps S509 and S510 of FIG. 41), the scanner γ correction table calculation is carried out (Step S509), and the thus-obtained correction values are stored in the memory 111, and thus, are set (Step S510).

As a result, even when the gray scale chart 50 includes an influence of a noise due to a stain or such, the influence can be removed to the utmost. As a result, it is possible to obtain the detection values nearer to the true values of the original tone levels of the gray scale chart 50. As a result, more proper scanner γ correction of read original image data can be achieved, and finer image formation can be achieved therefrom.

Further, the present invention is not limited to the above-described embodiments, and variations and modifications may be made without departing from the basic concept of the present invention claimed below.

The present application is based on Japanese Priority Applications Nos. 2005-204837, 2005-204840 and 2006-075710, filed on Jul. 13, 2005, Jul. 13, 2005 and Mar. 17, 2006, respectively, the entire contents of which are hereby incorporated herein by reference.

What is claimed is:

1. An image reading apparatus comprising:
    an image sensor in which a shift register for transferring electric charge from photodiodes is divided into a first half and a second half, from which image data is output in respective corresponding output directions;
    a linearity correcting part correcting linearity between image data obtained from the first half and the second half;
    a level detecting part detecting image data levels for the respective output directions of the first half and the second half to be used for the linearity correction, which image data levels correspond to image data of a connection point between the first half and the second half and are obtained from respective combinations for the respective output directions of the first half and the second half;
    a calculating part calculating linearity correction values or correction value calculating parameters from the detected image data levels for any one of the first half and the second half; and
    a defect detection part detecting a defect in the image data levels thus detected of the connection point.

2. The image reading apparatus as claimed in claim 1, further comprising a correcting part correcting the detected image data levels when said defect detecting part detects a defect in the image data level of the first half or the second half.

3. The image reading apparatus as claimed in claim 1, further comprising a display part displaying a defect indication when said defect detecting part detects a defect in the image data level of the first half or the second half.

4. The image reading apparatus as claimed in claim 1, further comprising a control part carrying out a retry when said defect detecting part detects a defect in the image data level of the first half or the second half.

5. The image reading apparatus as claimed in claim 1, wherein:

the image data of the connection point between the first half and the second half used for the correction comprises image data obtained when a grey scale chart is read.

6. The image reading apparatus as claimed in claim 1, further comprising a storage part storing the correction values or the correction value parameters.

7. An image forming apparatus provided with the image reading apparatus claim in claim 1.

8. An image inspecting apparatus, connected to an image reading apparatus which comprises an image sensor in which a shift register for transferring electric charge from photodiodes is divided into a first half and a second half, from which image data is output in respective corresponding output directions; and a linearity correcting part correcting linearity for the first half and the second half, for detecting image data of a connection point between the first half and the second half, said image inspecting apparatus comprising:
a taking part taking image data from said image reading apparatus;
a level detecting part detecting, from the image data taken by means of said taking part, image data levels for the respective output directions of the first half and the second half to be used for the linearity correction, which image data levels correspond to image data of the connection point between the first half and the second half and are obtained from respective combinations for the respective output directions of the first half and the second half; and
a defect detection part detecting a defect in the image data levels thus detected of the connection point.

9. The image inspecting apparatus as claimed in claim 8, calculating linearity correction values or correction value calculating parameters for any one of the first half and the second half from the image data levels detected by said level detecting part.

10. The image inspecting apparatus as claimed in claim 9, wherein:
the linearity correction values or the correction value calculating parameters thus calculated are transferred to said image reading apparatus.

11. An image forming system comprising:
the image inspecting apparatus as claimed in claim 8;
an image forming apparatus comprising the image reading apparatus; and
an instruction part for inputting an instruction to said image inspecting apparatus, and wherein:
said instruction part comprises an operation part of said image forming apparatus.

12. An image reading apparatus comprising:
an image sensor in which a shift register for transferring electric charge from photodiodes is divided into a first half and a second half, from which image data is output in respective corresponding output directions;
a digital converting part carrying out signal processing on the output from said image sensor for the respective output directions of the first half and the second half and converting it into digital output;
a combining part combining the digital output for the respective output directions of the first half and the second half;
a linearity correcting part correcting linearity for the respective output directions of the first half and the second half; and
a mode obtaining part obtaining modes in each of the respective output directions of the first half and the second half from histograms of a connection point between the first half and the second half of the data thus combined; and
a calculating part calculating correction values for linearity correction for any one of the first half and the second half with the use of the modes thus obtained.

13. The image reading apparatus as claimed in claim 12, further comprising a storage part storing the correction values calculated by said calculating part.

14. The image reading apparatus as claimed in claim 12, wherein:
the data used by said calculating part comprises image data obtained from a gray scale chart placed on an original reading part.

15. The image reading apparatus as claimed in claim 12, wherein:
the data used by said calculating part comprises image data obtained from a gray scale chart set in such a manner that it can be read as if an original is read.

16. The image reading apparatus as claimed in claim 12, further comprising a part of carrying out interpolation calculation for the correction value corresponding to an output corresponding to a tone between the respective tones actually read.

17. The image reading apparatus as claimed in claim 12, wherein:
said calculating part comprises a lookup table.

18. The image reading apparatus as claimed in claim 12, further comprising an instruction part for providing an instruction to said calculating part to actually carry out calculation of the linearity correction values, wherein said calculating part reads gray scale chart data in response to an execution instruction given from said instruction part, and carries out calculation of the correction values, and stores the same.

19. The image reading apparatus as claimed in claim 18, wherein said instruction part is provided in an operation part provided for inputting various operations.

20. An image forming apparatus provided with the image reading apparatus claimed in claim 12.

21. An image reading apparatus comprising:
an image sensor in which a shift register for transferring electric charge from photodiodes is divided into a first half and a second half, from which image data is output in respective corresponding output directions;
a digital converting part carrying out signal processing on the output from said image sensor for the respective output directions of the first half and the second half and converting it into digital output;
a combining part combining the digital output for the respective output directions of the first half and the second half;
a linearity correcting part correcting linearity for the respective output directions of the first half and the second half; and
a calculating part calculating correction values for linearity correction for any one of the first half and the second half based on data of the connection point between the first half and the second half of the thus-combined data for the respective output directions of the first half and the second half.

22. The image reading apparatus as claimed in claim 21, wherein:
gray balance adjustment is carried out with the use of any one of the first half image data and the second half image data used for the linearity correction, which one of the first half image data and the second half image data is regarded as a standard for the linearity correction, and after that, the linearity correction is carried out for the other one.

23. The image reading apparatus as claimed in claim 21, further comprising a storage part storing the correction values calculated by said calculating part.

24. The image reading apparatus as claimed in claim 21, wherein:
the data used by said calculating part comprises image data obtained from a gray scale chart placed on an original reading part.

25. The image reading apparatus as claimed in claim 21, wherein:
the data used by said calculating part comprises image data obtained from a gray scale chart set in such a manner that it can be read as if an original is read.

26. The image reading apparatus as claimed in claim 21, further comprising a part of carrying out interpolation calculation for the correction value corresponding to an output corresponding to a tone between the respective tones actually read.

27. The image reading apparatus as claimed in claim 21, wherein:
said calculating part comprises a lookup table.

28. The image reading apparatus as claimed in claim 21, further comprising an instruction part for providing an instruction to said calculating part to actually carry out calculation of the linearity correction values, wherein said calculating part reads gray scale chart data in response to an execution instruction given from said instruction part, and carries out calculation of the correction values, and stores the same.

29. The image reading apparatus as claimed in claim 28, wherein said instruction part is provided in an operation part provided for inputting various operations.

30. An image forming apparatus provided with the image reading apparatus claimed in claim 21.

* * * * *